(12) United States Patent
Zhou et al.

(10) Patent No.: US 7,742,906 B2
(45) Date of Patent: Jun. 22, 2010

(54) BALANCING COLLECTIONS OF VERTICES IN A NETWORK

(75) Inventors: Yunhong Zhou, Sunnyvale, CA (US); Robert E. Tarjan, Princeton, NJ (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 11/714,509

(22) Filed: Mar. 6, 2007

(65) Prior Publication Data

US 2008/0218518 A1 Sep. 11, 2008

(51) Int. Cl.
*G06F 17/50* (2006.01)
(52) U.S. Cl. .......................................... 703/13
(58) Field of Classification Search ..................... 703/13
See application file for complete search history.

(56) References Cited

U.S. PATENT DOCUMENTS

| | | | |
|---|---|---|---|
| 6,999,420 B1 | 2/2006 | Chiu | |
| 2004/0267648 A1* | 12/2004 | Schaub | 705/35 |
| 2008/0109392 A1* | 5/2008 | Nandy | 706/47 |

OTHER PUBLICATIONS

Bar-ilan et al. 1993. http://eprints.kfupm.edu.sa/44230. "How to allocate network centers". p. 1-30.*
Zhang et al., U.S. Appl. No. 11/048,301, entitled "System and Method for Selecting a Portfolio," filed Jan. 30, 2005, pp. 1-22, Figs. 1-4.
Zhang et al., U.S. Appl. No. 11/159,454, entitled "Determination of a State of Flow Through or a Cut of a Parameterized Network," filed Jun. 22, 2005, pp. 1-24, Fig. 1-6.
Zhang et al., U.S. Appl. No. 11/340,081, entitled "Determining an Amount of Flow Through, or a Cut of, a Parameterized Network," pp. 1-23, Figs. 1-7, Jan. 25, 2006.
Tarjan et al., U.S. Appl. No. 11/450,706, entitled "Identifying a Minimum Cut and/or a Maximum Flow Using Balancing of Vertex Excesses," filed Jun. 9, 2006, pp. 1-24, Figs. 1-5.
J.W.J. Williams, "Algorithm 232 Heapsort," Communications of the ACM, vol. 7, No. 6, pp. 347-349 (Jun. 1964).
J. Misra et al., "A Constructive Proof of Vizing's Theorem," Information Processing Letters 41(3), pp. 131-133 (Sep. 1990).
A. Goldberg et al., "Beyond the Flow Decomposition Barrier," Journal of ACM, 45(5), pp. 783-797. (Sep. 1998).
B.V. Cherkassky et al., "On Implementing Push-Relabel Method for the Maximum Flow Problem," Algorithmica 19(4), pp. 390-410 (Sep. 1994).
D.D. Sleator et al., "A Data Structure for Dynamic Trees," Journal of Computer and System Sciences, vol. 26, No. 3, pp. 362-391 (Jun. 1983).
A. Goldberg et al., "Finding Minimum-Cost Circulations by Successive Approximation," Mathematics of Operations Research, vol.15, No. 3, pp. 430-465 (Aug. 1990>.

(Continued)

*Primary Examiner*—Paul L Rodriguez
*Assistant Examiner*—Eunhee Kim

(57) ABSTRACT

A representation of a network having vertices connected by arcs is provided. Different collections of vertices in the network are iteratively selected. Balancing moves are performed in corresponding collections of the network, where the collections are represented by corresponding graphs according to a predefined structure.

13 Claims, 9 Drawing Sheets

OTHER PUBLICATIONS

A.V. Goldberg et al., "A New Approach to the Maximum-Flow Problem," Journal of the Association for Computing Machinery, vol. 35, No. 4, pp. 921-940 (Oct. 1988).

D. Hochbaum, "The Pseudoflow Algorithm and the Pseudoflow-Based Simplex for the Maximum Flow Problem," Proceedings of 6th International Conference on Integer Programming and Combinatorial Optimization, pp. 325-337 (Jun. 1998).

http:\\magma.maths.usyd.edu.au/magma/htmlhelp/text1417.htm, "Maximum Flow and Minimum Cut," pp. 1-7 (at least as early as Nov. 17, 2005).

http:\\128.32.125.151/riot/Applications/WeightedMinCut/, "The Minimum/Maximum Cut Problem" pp. 1-3 (at least as early as Nov. 17, 2005).

http:\\mathworld.wolfram.com/MaximumFlowMinimumCut-Theorem.html., "Maximum Flow, Minimum Cut Theorem," p. 1 (at least as early as Nov. 27, 2005).

http:\\people.brunel.ac.uk/ mastjjb/jeb/or/netflow.html, "OR-Notes," pp. 1-14 (at least as early as Nov. 17, 2005).

http:\\mathworld.wolfram.com/NetworkFlow.html, "Network Flow," pp. 1-2 (at least as early as. Nov. 17, 2005).

B. Zhang et al., "A Simultaneous Parametric Maximum-Flow Algorithm for Finding the Complete Chain of Solutions," pp. 1-15, Oct. 25, 2004.

B. Zhang et al., "Simultaneous Parametric Maximum Flow Algorithm with Vertex Balancing," pp. 1-8, Jun. 28, 2005.

B. Zhang et al., "A Simultaneous Maximum Flow Algorithm for the Selection Model," pp. 1-6, May 13, 2005.

Blum et al., Time Bounds for Selection, vol. 7, No. 4, Aug. 1973 (15 pages).

Tarjan et al., Balancing Applied to Maximum Network Flow Problems (Extended Abstract), Sep. 11-13, 2006 (12 pages).

U.S. Appl. No. 11/450,706, Non-Final Rejection dated Apr. 2, 2009, pp. 1-11 and attachments.

U.S. Appl. No. 11/450,706, Notice of Allowance dated Nov. 25, 2009, pp. 1-4 and attachments.

* cited by examiner

BALANCING COLLECTIONS OF VERTICES IN A NETWORK

CROSS REFERENCE TO RELATED APPLICATION

This application is related to U.S. Ser. No. 11/450,706, filed Jun. 9, 2006, which is hereby incorporated by reference.

BACKGROUND

A network of nodes and edges that connect the nodes can be used to represent various types of systems, such as communications systems, hydraulic systems, transportation systems, and so forth, which involve flow of some type of quantity from node to node through conduits having specified capacities. A network can also represent the flow of monetary amounts between nodes that represent products or services, where the monetary amounts can represent profit, revenue, or expense. Such networks can be analyzed for the purpose of solving an optimization problem, which involves finding the maximum flow between at least a source and at least a sink that are coupled by the nodes of the network as fast as possible. The analysis involves identifying the "minimum cut" and/or the "maximum flow" through the network.

Conventionally, identifying the minimum cut of and/or the maximum flow through a network is often time-consuming and computationally expensive, particularly when analyzing very large networks. Conventional algorithms for computing the maximum flow and/or minimum cut of a network are often relatively complex.

BRIEF DESCRIPTION OF THE DRAWINGS

Some embodiments of the invention are described with respect to the following figures.

DETAILED DESCRIPTION

Figure 1:
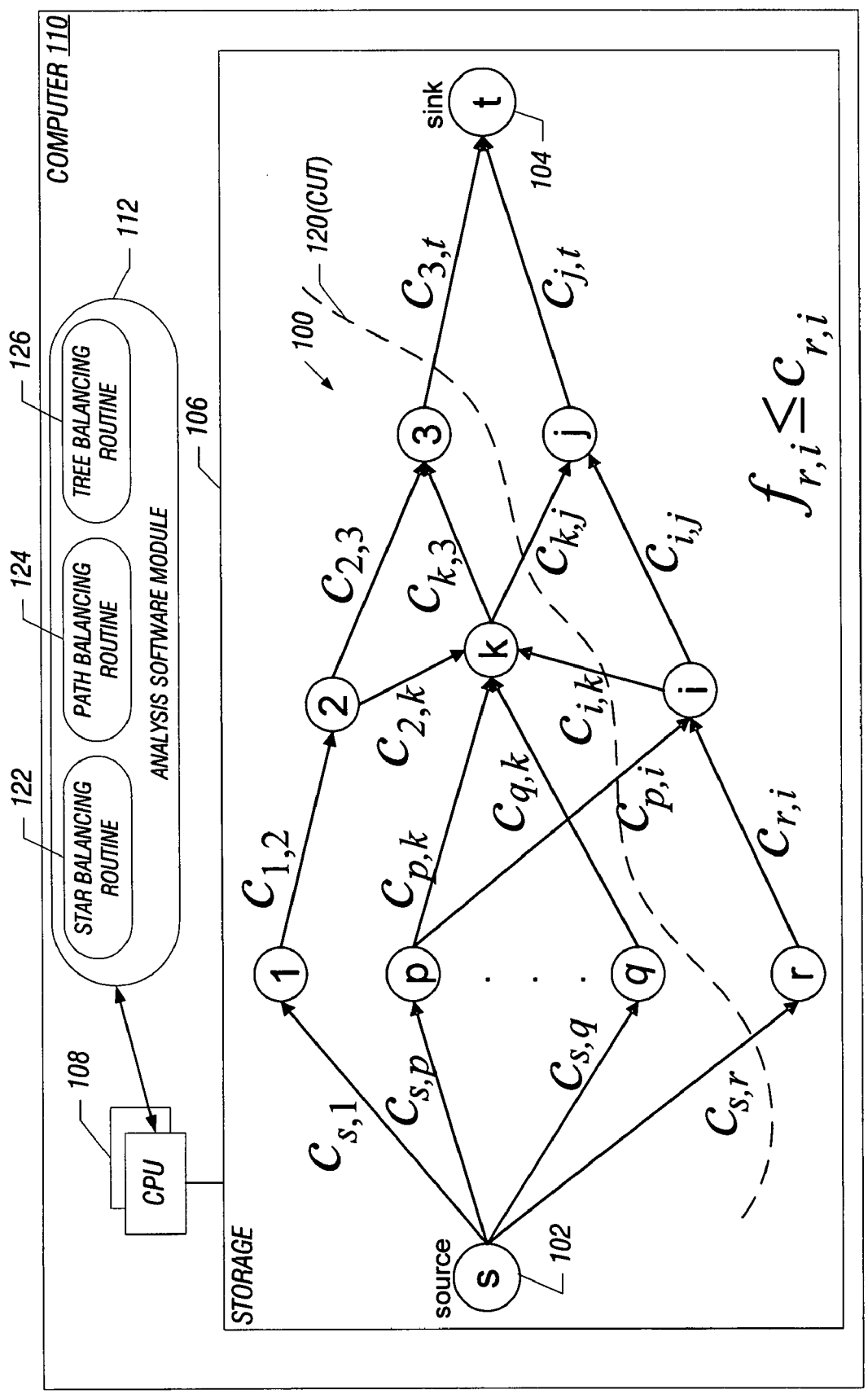
FIG. 1 is a block diagram of a computer that stores a representation of an example network that may be analyzed according to some embodiments of the invention.

FIG. 1 is a block diagram of an example computer 110 that has a storage 106 for storing a representation of a flow network 100 (or more simply, network 100) having intermediate nodes 1, 2, 3, p, k, q, r, i, j, that interconnect a source node or vertex 102 and a sink node (vertex) 104. The network 100 can represent various types of systems, including network systems, computer systems, transportation systems, hydraulic systems, communications systems, financial systems, a project, machine, or crew scheduling systems, location and layout determination systems, warehouse and distribution systems, production planning and control systems, energy minimization or reduction systems, and so forth. The network 100 can also be used in other applications including social, medical, or military applications.

Nodes (vertices) in the network represent various different types of network elements, such as processing elements, storage elements, switching or routing elements, financial nodes, transportation nodes, and so forth. Quantities (which can represent amounts of data or things; monetary amounts such as profit, revenue, and costs; amounts related to performance of services; and other amounts) flow from the source node 102 to the sink node 104 through intermediate nodes and conduits connecting the source node 102, intermediate nodes, and sink node 104. Computations relating to network flows can be used for various applications, such as scheduling for transportation networks, routing of packets in a communications network, scheduling machinery and crew for construction projects, managing energy in a power network, performing protein classification, and so forth.

In some embodiments, the network 100 of FIG. 1 is a "capacitated network." A "capacitated network" is represented by a directed graph G=(V, A) with two distinguished vertices, a "source" s and a "sink" t (represented as nodes 102 and 104, respectively, in FIG. 1), along with a non-negative "capacity function" c on the arcs in the set of arcs A. V represents the set of vertices, including the source and sink vertices as well as intermediate vertices. A "vertex" refers to a node of the graph representing a network, such as the network of FIG. 1. In the example network 100 of FIG. 1, G represents the network, V represents the set of nodes, and A represents the set of arcs interconnecting the nodes. The terms "vertex" and "node" are used interchangeably. For this discussion, it is assumed that the graph G is "symmetric"; in other words, (v,w) (conduit from vertex v to vertex w) is an arc if and only if (w,v) is also an arc. The pair of arcs (v,w), (v,w) is sometimes referred to as an "edge" {v,w}. If an arc has sufficient capacity, then quantities can flow over the arc from one vertex to another vertex.

A non-symmetric network can be made symmetric without affecting the maximum flow problem by adding an arc (w,v) with zero capacity for each arc (v,w) whose reversal (w,v) is not originally present. It is assumed (without loss of generality) that arcs into the source and out of the sink have zero capacity.

In the discussion below, n denotes the number of vertices in the set of vertices V, m denotes the number of arcs in the set of arcs A, and U denotes the maximum arc capacity, assuming that arc capacities are all integers.

In some embodiments, a "pseudoflow" on the graph G is a real-valued function $f$ on the arcs that is antisymmetric: $f(v,w)=-f(w,v)$ for every arc $(v,w)$, and obeys the following capacity constraints: $f(v,w) \leq c(v,w)$ for every arc $(v,w)$ (flow $f$ on the arc is less than the capacity c). A pseudoflow is not a flow since it exhibits the following characteristic: an amount flowing into a vertex v ($\neq$s, t) may be different from the amount coming out of the vertex. Such a network is said to exhibit a pseudoflow. This is contrasted with a flow where the amount flowing into any vertex v ($\neq$s, t) is equal to the amount coming out of the vertex v. Generally, a network exhibits a pseudoflow if an amount of flow into the network (or any subset of the network) exceeds or is less than an amount of flow out of the network (or any subset of the network). A "balanced pseudoflow" is a pseudoflow with the following condition: $e(v)=e(w)$ if $r(v,w)>0$ for every arc $(v,w)$; in other words, a balanced pseudoflow is a pseudoflow with no active arcs.

The quantity $f(v,w)$ represents a net flow from vertex v to vertex w. Given a pseudoflow, the excess $e(v)$ at a vertex v is $\Sigma\{f(u,v)|(u,v) \text{ is an arc}\}$. For example, in FIG. 1, the excess at vertex k, $e(k)$, is the sum of the flows into vertex k, or sum of $f(2,k)$ (flow from vertex 2 to vertex k), $f(p,k),f(q,k)$, and $f(i,k)$, less the flow out of vertex k, or the sum of $f(k,3)$ and $f(k,j)$. In other words, $e(k)=(f(2,k)+f(p,k)+f(q,k)+f(i,k))-(f(k,3)+f(k,j))$. A positive excess at vertex v means there is more flow into the vertex v than out of the vertex v. A pseudoflow is a "preflow" if $e(v)$ is non-negative for every v other than s and t, and the pseudoflow is a flow if $e(v)$ is zero for every v other than s and t. The value of a flow is $e(t)$, which is the excess at target vertex t. A flow is "maximum" if it has maximum value over all possible flows. The maximum flow is a flow of maximum value from the source s to the sink t.

The computer 110 also includes an analysis software module 112 according to some embodiments that solves the problem of finding a minimum cut and/or a maximum flow (from source to sink) in a given network represented by the graph G. The analysis software module 112 is executable on one or more central processing units (CPUs) 108. As described in greater detail further below, an algorithm used by the analysis software module 112 according to some embodiments employs the pseudoflow concept noted above to determine the minimum cut and/or maximum flow.

A "cut" is a partition of the vertex set (V) (set of vertices in the graph G) into two parts, one containing s and the other containing t. A "source cut" is denoted by the set S of vertices in the part of the partition containing the source. An arc (v,w) with v but not w in S "crosses" the source cut S. The capacity of a source cut S is $\Sigma\{c(v,w)|(v,w) \text{ is an arc crossing } S\}$; in which c(v, w) represents the capacity of an arc (v, w). A cut is minimum if it has minimum capacity. The minimum cut problem is that of finding a minimum cut in a given network.

An example dashed line (dividing line) 120 in FIG. 1 illustrates a minimum cut. As depicted in FIG. 1, the dividing line 120 separates the source node 102 from the sink node 104. The dividing line 120 divides the nodes in the network into two sets, a first set (the source cut) that includes the source node 102, and a second set that includes the sink node 104. A minimum cut is a cut of minimum capacity; in other words, the sum of capacities of arcs crossing the cut is minimum.

The classic maximum-flow minimum-cut theorem states that the value of any flow is no greater than the capacity of any cut, and the value of a maximum flow equals the capacity of a minimum cut. Given a maximum flow, it is easy to find a minimum cut in time linear to the network size; however, a linear-time way to find a maximum flow given a minimum cut is not conventionally known.

The analysis software module 112 uses an iterative algorithm to find a minimum cut and an extension to find a maximum flow of a capacitated network. The algorithm for finding a minimum cut maintains a pseudoflow in the network. In addition, the algorithm for finding a minimum cut uses a balancing procedure according to some embodiments that performs balancing moves between vertices of the network (characterized by a pseudoflow) until a stopping criterion is satisfied. The balancing loop causes a balanced pseudoflow (or substantially a balanced pseudoflow) to be derived from the pseudoflow.

Given a pseudoflow, the residual capacity of an arc (v,w) is $r(v,w)=c(v,w)-f(v,w)$ (capacity of the arc less the flow on the arc). An arc (v,w) is saturated if r(v,w) is zero; otherwise, the arc is unsaturated or residual. A balanced pseudoflow is a pseudoflow satisfying the following property: for each arc (v, w), if $e(v)>e(w)$, then $r(v, w)=0$, in other words, (v, w) is saturated. An arc (v,w) is active if the arc is unsaturated and $e(v)>e(w)$ (the excess of vertex v is greater than the excess at vertex w); an active arc (v,w) is "α-active" for some positive α if $e(v) \geq e(w)+\alpha$. A cut is saturated if every arc crossing the cut is saturated. A flow is maximum and a cut is minimum if and only if the flow saturates every arc crossing the cut.

As discussed in further detail below, the balancing procedure can be one of a "star balancing" procedure, a "path balancing" procedure, and a "tree balancing" procedure. In the star balancing procedure, vertices of the network are visited in some order (e.g., round-robin), and each vertex and its neighboring vertices (representing a star) are balanced simultaneously. The star balancing procedure is performed by a star balancing routine 122 in the analysis software module 112.

In the path balancing procedure, a path of k (some predefined number) vertices along which associated excesses are non-increasing is identified. Balancing is then performed over this identified path. The procedure walks along the path one vertex at a time, maintaining an arrangement of excesses in the part of the path reached so far such that there are no active arcs and the excesses are still in non-increasing order along the path. The path balancing procedure is performed by a path balancing routine 124 in the analysis software 112.

In the tree-balancing procedure, given an undirected tree of vertices within the network, a vertex in the undirected tree can be picked as a root to make the tree a directed tree. Balancing is then performed in this directed tree. The tree balancing procedure is performed by a tree balancing routine 126 in the analysis software 112.

All three routines 122, 124, and 126 can be part of the analysis software module 112, or alternatively, less than all three routines are part of the analysis software module 112. If two or more of the routines 122, 124, and 126 are present, the analysis software module 112 can select one of the routines to use for the balancing procedure.

Figure 2:
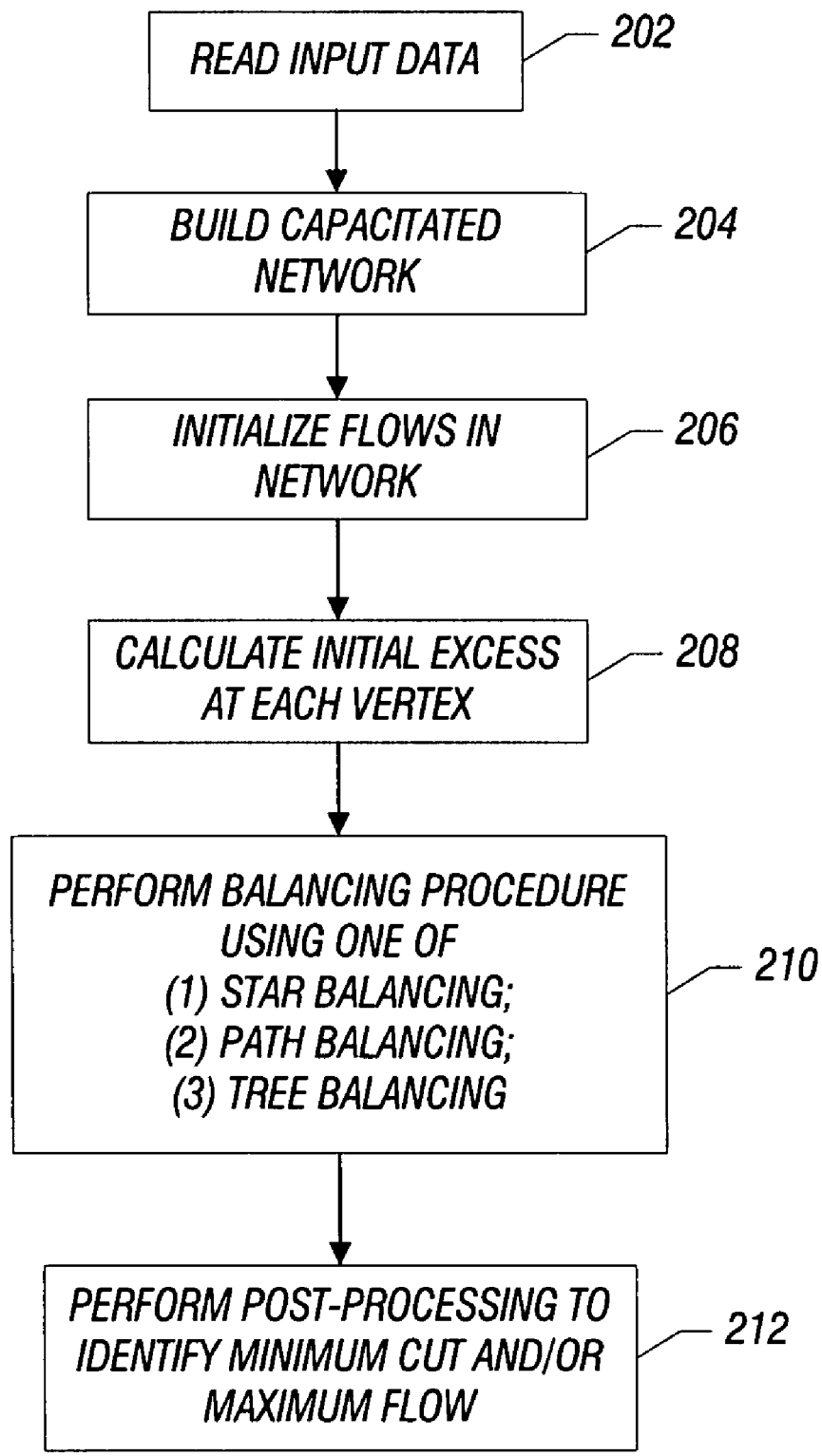
FIG. 2 is a flow diagram of a general process for tasks to enable identification of a minimum cut and/or a maximum flow in the network of FIG. 1, according to some embodiments.

FIG. 2 illustrates a process according to some embodiments performed by the analysis software module 112 (FIG. 1). The analysis software module 112 reads (at 202) input data related to a graph representing a network, which includes vertices, arcs, and capacities of the arcs. Based on the input data, the analysis software module 112 builds (at 204) a capacitated flow network, such as the flow network 100 depicted in FIG. 1. A representation of this capacitated flow network is stored.

Next, the flows in a network are initialized (at 206) such that an initial pseudoflow is provided. Note that some of the arcs may have zero flow. The analysis software module 112 then calculates (at 208) the initial excess at each vertex of the capacitated flow network. As part of the initialization to choose the initial pseudoflow, which can be a zero pseudoflow, source and sink dummy excesses of ∞ and −∞, respectively, can be assigned. Alternatively, the initialization can assign finite large values to the source and dummy excesses. Assigning large initial values to the source vertex (102) and the sink vertex (104) allows the flows of quantities to occur from vertices with large excesses to vertices with smaller excesses, over arcs that are unsaturated.

The movement of quantities from vertices with larger excesses to vertices with smaller excesses is iteratively performed in a balancing procedure (at 210) until no further moves can be made or until a stopping criterion has been satisfied. In performing the balancing procedure, the corresponding balancing routine (122, 124, or 126) is repeatedly invoked for different portions (collections) of the network, such that the collection (star, path, or tree) is balanced one at a time.

Further details regarding the various balancing algorithms that can be used in the balancing procedure is discussed further below. Once the balancing procedure is completed, then post-processing is performed (at 212) to find a minimum cut and/or a maximum flow.

Star Balancing Algorithm

In accordance with an embodiment, a star-balancing algorithm, performed by the star balancing routine 122, that can be used in the balancing procedure (at 210 in FIG. 2) visits vertices of a network in a round-robin fashion (or in some other order) and balances each vertex and its neighboring vertices simultaneously. Each vertex together with its neighboring vertices makes a star topology (represented by a star graph such as that in FIG. 3). Thus, if the star-balancing algorithm can balance a star graph relatively fast, then the star-balancing algorithm can be efficiently used for computing a global balanced pseudoflow or for finding a maximum flow in the network 100 of FIG. 1. In one embodiment, a star graph can be balanced in an amount of time proportional to the size of the star graph. The star-balancing algorithm according to an embodiment is depicted in FIG. 4.

Figure 3:
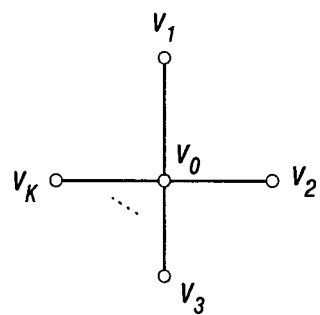
FIG. 3 depicts vertices of the network arranged in a star, according to an embodiment.

For a star graph, suppose that there are k edges $\{v_0, v_i\}$ for $i=1, \ldots, k$, where $v_0$ is the center of the star and $v_0$ has degree k. An example of such a star graph is depicted in FIG. 3. For each vertex $v_i$ (the vertices surrounding the center vertex $v_0$), its initial excess is $e_0(v_i)$ and its final excess is $e^*(v_i)$.

Figure 4:
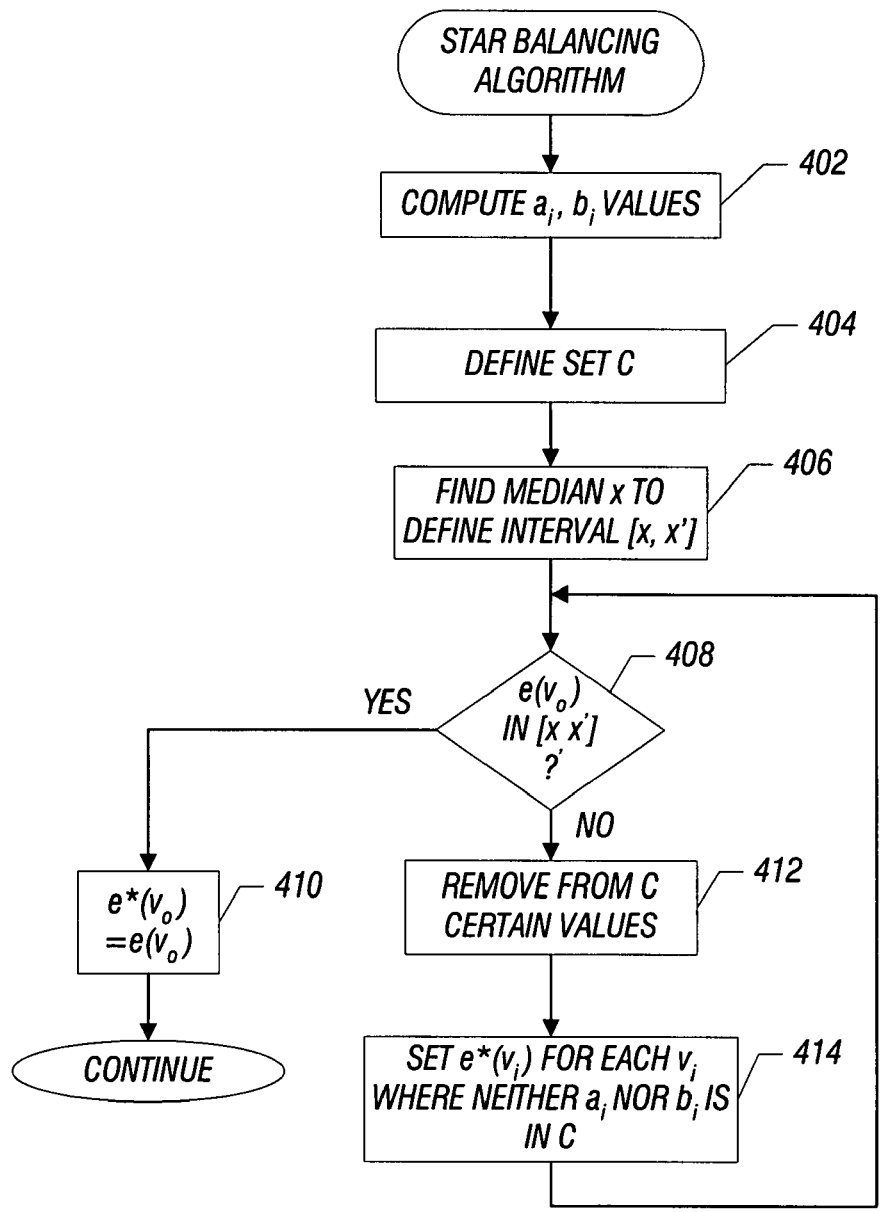
FIG. 4 is a flow diagram of a process for a star balancing algorithm, according to an embodiment.

As depicted in the balancing algorithm of FIG. 4, for each vertex $v_i$ where $1 \leq i \leq k$, two parameters $a_i, b_i$ are computed (at 402), where $a_i$ is the minimum possible final excess value, and $b_i$ is the maximum possible final excess value for the vertex $v_i$. Recall that the excess value of a particular vertex is equal to the sum of the flow into the particular vertex less the sum of the flow out of the vertex. The parameters $a_i$ and $b_i$ can be computed as follows:

$$a_i = e_0(v_i) - c(v_i, v_0), \quad b_i = e_0(v_i) + c(v_0, v_i). \quad \text{(Eq. 1)}$$

Basically, the minimum possible excess value $a_i$ is equal to the initial excess value $e_0(v_i)$ less the capacity from $v_i$ to $v_0$; and the maximum excess value $b_i$ is equal to the initial excess value $e_0(v_i)$ plus the capacity from $v_0$ to $v_i$. For the final balanced pseudoflow (after movement of quantities from vertices of larger excesses to vertices of smaller excesses in the star graph), the neighboring vertices of $v_0$ can be divided into three groups: (1) a subset of vertices $v_i$ with $(v_0, v_i)$ saturated and $e^*(v_i) = b_i < e^*(v_0)$; (2) a subset of vertices $v_j$ with $(v_j, v_0)$ saturated and $e^*(v_0) < e^*(v_j) = a_j$; and (3) a subset of the remaining vertices which all have excess equal to $e^*(v_0)$.

Once the final excess $e^*(v_0)$, has been determined, flows over all the edges can be computed in linear time. Thus, the challenge is to compute $e^*(v_0)$, which is the final excess value for the center vertex $v_0$.

As further depicted in FIG. 4, a set $C = \{a_i, b_i | i=1, \ldots, k\}$ is defined (as 404), where C is a set of all the $a_i$ and $b_i$ values of the vertices $v_i$ around the center vertex $v_0$ in the star graph. Set C has at most 2k distinct elements, and these numbers partition $(-\infty, +\infty)$ into at most 2k+1 intervals. In other words, there are 2k values ($a_i$ and $b_i$ for $i=1, \ldots, k$) in the set C, which 2k values define 2k+1 intervals. The star-balancing algorithm according to an embodiment attempts to guess the unique interval of the 2k+1 intervals that $e^*(v_0)$ belongs to. For example, a median-finding subroutine (part of the star balancing routine 122) can be used to locate the median x of C and its closest right neighbor x' (at 406), and to guess that $e^*(v) \in [x, x']$. Finding the median x means finding a median value from among the 2k $a_i$, $b_i$ values in set C. It takes time proportional to |C| to find both x and x'. Once x, x' are known, for each given $v_i$, then either interval $[a_i, b_i]$ associated with the given $v_i$ contains interval [x, x'], or these two intervals are disjoint. If $b_i \leq x$, then $e^*(v_i) = b_i$ (subset (1) above); if $a_i \geq x'$, $e^*(v_i) = a_i$ (subset (2) above); otherwise $a_i \leq x < x' \leq b_i$, and $e^*(v_i) = e^*(v_0) = e(v_0)$ (subset (3) above). Given that the sum of excesses is invariant, the following relationship is defined:

$$\sum_{0 \leq i \leq k} e_0(v_i) = \sum_{i:b_i \leq x} b_i + \sum_{i:x' \leq a_i} a_i + \left(1 + \sum_{i:a_i \leq x \leq x' \leq b_i} 1\right) e^*(v_0). \quad \text{(Eq. 2)}$$

The excess $e(v_0)$ is obtained using Eq. 2, and it is verified (at 408) whether $e(v_0)$ belongs to [x, x']. If so, then the median-finding subroutine has guessed the correct interval and the value of $e^*(v_0)$ has been found. As a result, $e^*(v_0)$ is set (at 410) equal to $e(v_0)$, and the procedure stops. However, if $e(v_0) > x'$, then $e^*(v_0) > x$ and all numbers $(a_i, b_i)$ less than or equal to x can be removed (at 412) from C. If $e(v_0) < x$, then $e^*(v_0) < x'$ and all numbers $(a_i, b_i)$ greater than or equal to x' can be removed (at 412) from C. As a result, C is updated by removing items from C, such that the size of C shrinks.

In both cases noted above where $e(v_0) > x'$ or $e(v_0) < x$, for each vertex $v_i$ if neither $a_i$ nor $b_i$ belongs to the updated C, the final excess value for $v_i$ can be set and is removed from further consideration. For the updated C, the tasks at 406-414 are repeated until the correct interval is found for $e^*(v_0)$.

Effectively, for each updated C, a new interval [x, x'], referred to as $I_m$ (m>1, where $I_1$ is the first interval [x, x'] discussed above), is found. Also, the excess $e(v_0)$ is recomputed for the new interval. If $e(v_0)$ is in $I_m$, then the final excess $e^*(v_0)$ has been found. However, if $e(v_0)$ is not in $I_m$, C is updated again by removing elements and the process continues by iterating through m for new intervals. The number of vertices that are considered is bounded by |C| (the size of C), and the processing time of each step is proportional to |C|. After one iteration, |C| shrinks by half and the number of vertices with their excesses not fixed is also bounded by |C|. The star balancing algorithm runs in time proportional to the size of the star graph.

Variations from the above star balancing algorithm can be provided in some embodiments. A first variant of the star balancing algorithm is to sort all the possible minimum and maximum excesses for all vertices adjacent to the center vertex. In other words, let $a_i$, $b_i$ be the minimum and maximum excesses for vertex $v_i$, where $v_i$ ranges over all the adjacent vertices of the center vertex $v_0$. Then the set $\{a_i, b_i | i=1, \ldots, k\}$ is sorted in strictly increasing order. This takes worst case $O(k \log k)$ time with any standard sorting algorithm such as merge sort or heap sort. For the star balancing algorithm, instead of using linear-time median selection (as discussed above) to find an interval to start the guessing phase, the interval can be found in $O(1)$ time after sorting. This avoids calling a linear time median selection subroutine repeatedly, and sorting is performed just once.

A second variant of the star balancing algorithm is to use random selection instead of using a linear time median selection algorithm to find the median x of C. A random element x is picked from C and the smallest element x' in C with x'>x is identified, and interval [x, x'] is used for the guessing process. Alternatively, the largest element x" in C with x"<x is identified and interval [x", x] is used for the guessing process. In yet another variation, element x'" in C different from x is identified, and |x'"-x| is minimized. The expected running time of this algorithm (using random selection of x with intervals defined based on x', x", or x'") is still linear, even though in the worst case it can be quadratic. It avoids both sorting and median selection subroutines, and thus can be simpler than previous approaches.

Note that the above describes the balancing of a collection of vertices in the network 100, where the collection is assigned as a star of vertices (star topology that is represented by a star graph). The collection of vertices is just one part (subset) of the entire network. To produce a balanced pseudo-flow for the network, different collections (stars) are selected and balanced until the entire network is balanced (or until some stopping rule is satisfied). Thus, in the above embodiment, the balancing procedure iteratively selects different collections (stars) of vertices to perform balancing, where each collection (star) is balanced according to FIG. 4, or according to some variant of the star balancing algorithm. The star balancing routine 122 is iteratively and repeatedly invoked to process the different collections (stars).

To improve performance and efficiency of the balancing procedure, instead of visiting the vertices in a round-robin fashion as discussed above, the algorithm can be modified by visiting just vertices in a "working set" of vertices. Initially, the working set includes all vertices of the network. Each time the algorithm applies star balancing to a star centered at vertex v, the algorithm checks whether the operation changes the excess for any of the vertices involved. If not, the algorithm removes v from the working set. When the balancing procedure stops, or when a new active section is found, the algorithm makes sure that all vertices not contained in the working set are balanced. If not, then the algorithm puts such vertices back into the working set and continues the balancing procedure.

Another heuristic for improving the performance of the balancing procedure is related to ranking vertices in a specified order. When the algorithm visits a center vertex v, the algorithm considers just adjacent vertices w where the rank of w is lower than the rank of v. This heuristic essentially reduces the average size of a star subgraph by half. There are many kinds of ranking techniques. A predefined ordering among all the vertices is a feasible approach. Another ordering of the vertices is based on ranking all vertices using their excesses, and breaking ties arbitrarily.

Another heuristic for improving performance of the balancing procedure relates to stopping earlier to obtain an approximate solution for the minimum cut/maximum flow computation. The algorithm keeps track of the current cut capacity, the sum of positive excesses in the active section and the sum of negative excesses in the active section. If the algorithm stops early, the algorithm obtains a cut, and an estimate about how far away the cut's capacity is from the minimum cut capacity. As an example, suppose that there are three sets P, A, Q where A is the active section, P contains all vertices with positive excesses except vertices in A, Q contains all vertices with negative excesses except vertices in A. Let the capacity of cut (P, A∪Q) be p, the sum of positive excesses for vertices in A is a, then the minimum cut capacity is at least p−a and the current cut capacity is at most p/(p−a) times the minimum cut capacity. A similar estimate applies to the cut (P∪A, Q).

Path Balancing Algorithm

Figure 5:
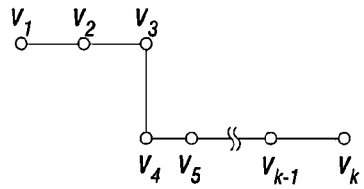
FIG. 5 depicts vertices of the network arranged in a path, according to another embodiment.

Instead of using the star balancing algorithm discussed above, a path balancing algorithm can be used instead. With the path balancing algorithm, the collections of vertices are made up of corresponding paths (an example path of vertices is depicted in FIG. 5). The path of vertices includes k vertices ($v_1, v_2, \ldots, v_k$) along a path. In one variant of the path balancing algorithm, the path is a monotone path such that the k vertices along the path have vertex excesses that are either non-increasing or non-decreasing. Due to symmetry between non-increasing and non-decreasing sequences, the discussion is restricted to monotone paths with non-increasing excesses along the path.

The monotone path balancing algorithm (as provided by the path balancing routine 124 according to an embodiment) walks along the path one vertex at a time, maintaining an arrangement of excesses on the part of the path reached so far such that there are no active arcs and the excesses are still in non-increasing order along the path. This arrangement (of parts of the path that have been reached so far) includes contiguous groups of vertices of equal excess, such that all arcs between groups are saturated. Within each group, the vertices have equal excess (referred to as the "common excess" of the group). The monotone path balancing algorithm maintains a stack of the groups, with first-to-last order along the path corresponding to bottom-to-top order on the stack. The algorithm stores the size of each group and the common excess of all vertices in the corresponding group. The algorithm processes each vertex and its incoming and outgoing arcs in one step. To avoid special cases for the first and last vertices on the path, two dummy arcs with capacity zero are added to the path, one into the first vertex on the path and another dummy arc out of the last vertex on the path. The algorithm starts with an empty stack and iterates for each vertex v along the path.

Let $g(v)=c(u,v)+e(v)−c(v,w)$, where (u, v) and (v, w) are the arcs into v (the vertex currently being considered) and out of v along the path, respectively. The value g(v) is the minimum excess that vertex v can attain while minimizing the sum of excesses of the previous vertices.

Figure 6:
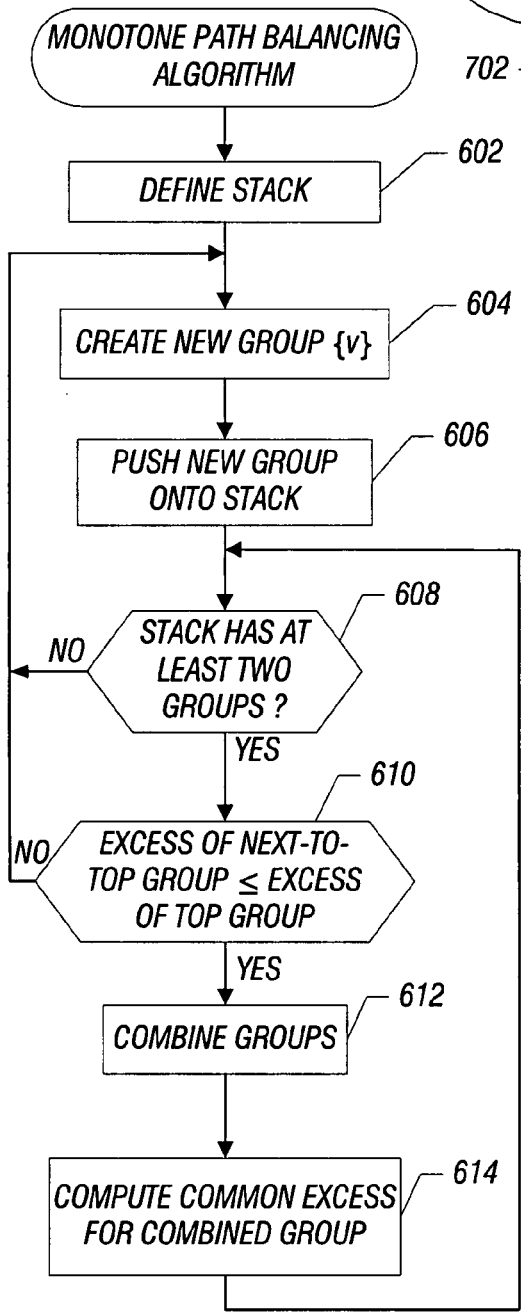
FIG. 6 is a flow diagram of a process for a monotone path balancing algorithm, according to an embodiment.

FIG. 6 shows a flow diagram of a monotone path balancing algorithm, according to an embodiment. In the algorithm, a stack (which is initially empty) is defined (at 602). A new group {v} is created (at 604) that includes just one vertex v, with excess g(v), and the new group {v} is pushed (at 606) onto the stack.

Next, the monotone path balancing algorithm determines (at 608) whether the stack has at least two groups. If not, the process at 604 and 606 is repeated to add another group. However, if the stack has at least two groups, the algorithm determines (at 610) if the vertices in the next-to-top group have common excess less than or equal to the common excess of the vertices in the top group. If so, the top two groups are combined (at 612) into a single group (combination group), whose number of vertices is the total number of vertices in the combined groups (the next-to-top group and the top group), and whose vertices have common excess equal to the weighted average of the excesses in the combined groups. The average excess is computed (at 614), where the average excess is an average of the common excesses of the combined groups weighted by the number of vertices in those groups. For example, if group 1 has two vertices with common excess value 2, and group 2 has one vertex with excess value 5, then the weighted average would be (2+2+5)/3=3, which would be the common excess for the combination group. Combining the next-to-top group and the top group causes moves to occur between the vertices in the combined group. The moves cause the excesses of the vertices to achieve the weighted average of the excesses of the two groups. Note that the effect of combining groups is that the vertices of the combination group all have the same excess.

If the algorithm determines (at 610) that the common excess of the next-to-top group is greater than the common excess of the top group, then the groups are not combined, which means that the top group now becomes distinct from the next-to-top group, and there are at least two groups remaining. In this scenario, the process returns to step 604 where the above steps are repeated to process the next vertex v with excess $g(v)$. This procedure continues until the last vertex in the path has been processed.

Once the algorithm reaches the last vertex in the path, the excesses defined by the groups result in there being no active arcs in the path. The flows can be computed on all the arcs in a second pass, using the initial and final excesses of the vertices. The excesses computed by the monotone path balancing algorithm are actually realizable because all arcs between groups remain saturated, combining two groups corresponds to reducing the flow along all the arcs spanning these two groups to non-negative values. The vertices in the path have non-decreasing (or non-increasing) excesses.

The above describes a simplified path balancing algorithm for the monotone path scenario. Alternatively, a general path balancing algorithm is provided for the general scenario where the path is not a monotone path, in other words, the vertices along the path have excesses that are neither monotone increasing nor monotone decreasing.

Figure 7A:
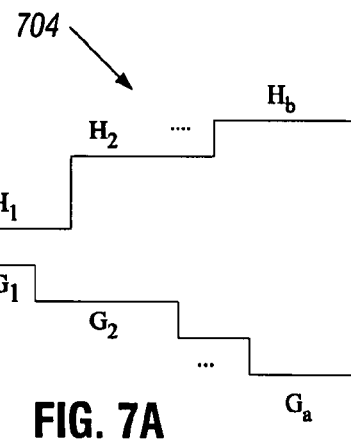
FIG. 7A depicts a path of vertices that includes a frozen part and an active part, according to an embodiment.

In this general case, let the path to be balanced be represented as $(v_1, v_2, \ldots, v_k)$, as depicted in FIG. 5. With the general path balancing algorithm, the vertices are processed in order along the path, just as in the monotone path balancing algorithm, but some additional information is maintained. Also, as depicted in FIG. 7A, an initial part (702) of the path whose final excesses are independent of the rest of the path can be iteratively frozen (so that the frozen part 702 is no longer considered in further processing). The non-frozen part 704 is referred to as the "active part" of the path. The vertices in the frozen part 702 are already balanced—in other words, in the frozen part 702, no further flow is possible from vertex with higher excess to vertex with lower excess. The task that remains is then to balance the excesses of the vertices in the active part.

The algorithm denotes by $v_s$ the first vertex of the active part. Either arc $(v_{s-1}, v_s)$ is saturated or are $(v_s, v_{s-1})$ is saturated. For each vertex v in the active part, two excesses, $g(v)$ and $h(v)$, are maintained. Initially $g(v)$ is the minimum excess that v can attain while minimizing the sum of excesses of the previous vertices, and $h(v)$ is the maximum excess that v can attain while maximizing the sum of excesses of the previous vertices. These values will have the following properties:

$g(v) < h(v)$ for all v in the active part;

$g(v) \geq (w)$ if $\{v, w\}$ is an edge in the active part, with $g(v)=g(w)$ unless $(v, w)$ is saturated (in which case $g(v) > g(w)$);

$h(v) \leq h(w)$ if $\{v, w\}$ is an edge in the active part, with $h(v)=h(w)$ unless $(w, v)$ is saturated (in which case $h(v) < h(w)$).

Various values of $g(v)$ and $h(v)$ for different vertices are depicted in FIG. 7A. As depicted in FIG. 7A, $g(v)$ values are monotonically decreasing (from left to right in the path), whereas $h(v)$ values are monotonically increasing (from left to right in the path).

The values of $g(v)$, referred to as g-values, partition the vertices in the active part into G-groups $G_1, \ldots, G_a$ where all nodes within the same G-group have the same g-value; for convenience, the common g-value of group $G_i$ is maintained as $g(G_i)$ along with the number of vertices $n(G_i)$ for each G-group. Similarly, the values of H partition the vertices in the active part into H-groups $H_1, \ldots, H_b$ where all nodes within the same H-group have the same h-value. The common h-value of nodes in $H_j$ is $h(H_j)$ and the size of $H_j$ is $n(H_j)$. In general the G- and H-partitions need not be the same. The arcs between G-groups depicted in FIG. 7A are forwardly saturated, whereas the arcs between H-groups are backwardly saturated.

The algorithm stores the groups of both partitions in a double-ended queue D (see FIG. 7B) ordered by excess. Thus, from smallest-to-largest excess (front-to-back of the double-ended queue), the following is observed: $G_a, G_{a-1}, \ldots, G_1, H_1, \ldots, H_b$ with $g(G_a) < g(G_{a-1}) < \ldots < g(G_1) < h(H_1) < \ldots < h(H_b)$.

As in the monotone path balancing algorithm, dummy arcs with zero capacity are added at the beginning and end of the path. The processing of each successive vertex is like that in the algorithm for a monotone path, with the following differences:

(1) each vertex is initially in a singleton G-group and a singleton H-group (in other words, each vertex v is in two groups, instead of the vertex being just in one group in the monotone case);

(2) G-groups and H-groups at the ends of the queue D are combined when their excesses are out-of-order, instead of just groups at the front of the stack (as in the monotone case);

(3) when $g(G_1)$ and $h(H_1)$ are out-of-order, some vertices are removed from the active part and added to the frozen part 702 (FIG. 7A).

Note that the monotone path balancing algorithm is a special case of the general path balancing algorithm. The stack used in the monotone case is basically a queue, except that it is a single-ended queue rather than a double-ended queue.

Figure 7B:
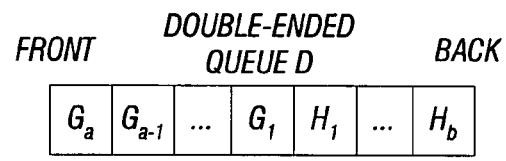
FIG. 7B depicts a double-ended queue to store groups of vertices for a general path balancing algorithm, according to a further embodiment.
Figure 8:
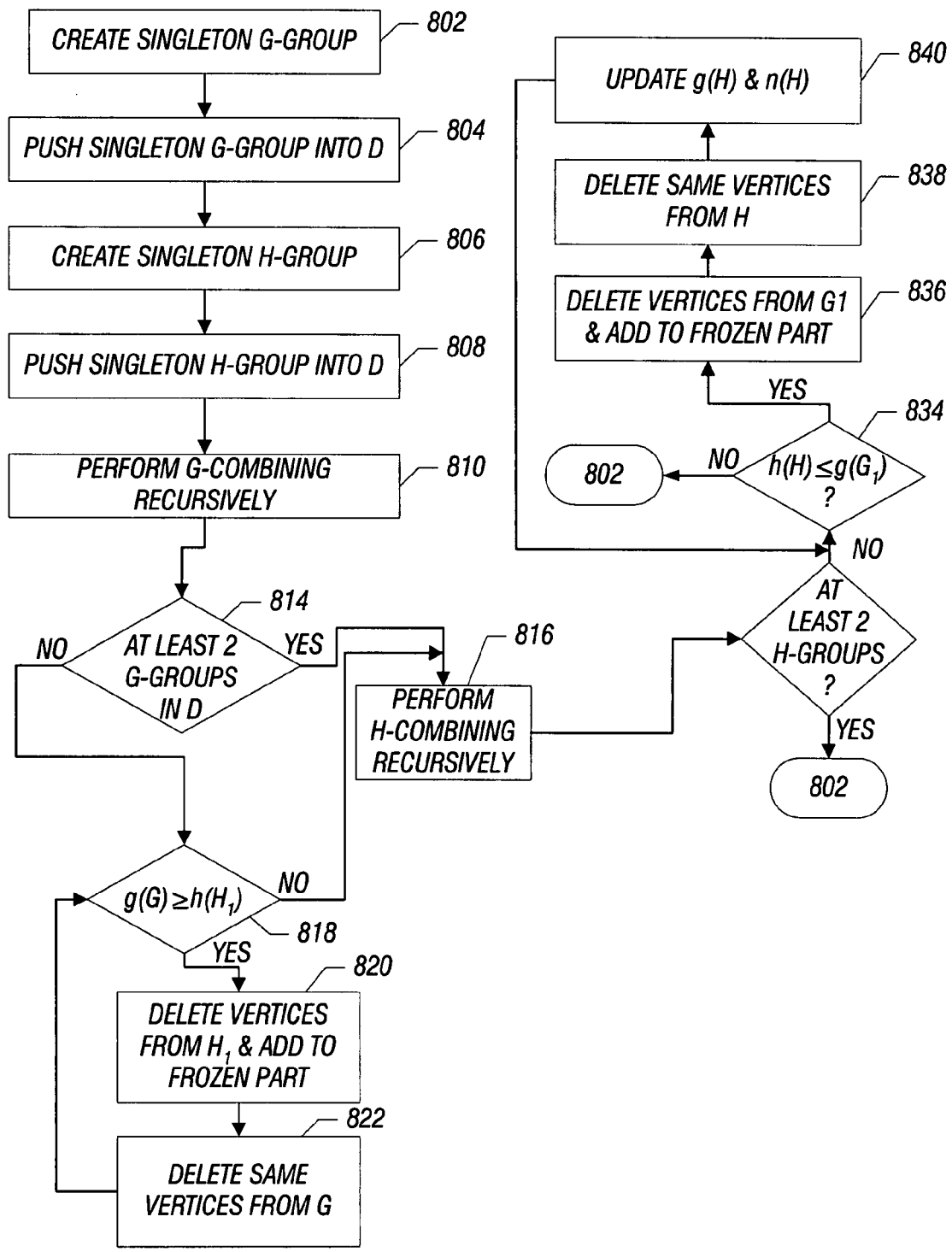
FIG. 8 is a flow diagram of a process for the general path balancing algorithm, according to a further embodiment.

Initially the queue D of FIG. 7B is empty. As depicted in FIG. 8, to process a vertex v with predecessor u and successor w, a new singleton G-group containing v is created (at 802), with excess $g(v)=c(u,v)+e(v)-c(v,w)$, and the singleton G-group is pushed (at 804) into the front end of the queue D. Additionally, a new singleton H-group containing v (the same vertex) is created (at 806), with excess $h(v)=c(w, v)+e(v)-c(v,u)$, and the singleton H-group is pushed (at 808) into the back end of the queue D. Note that for each processed vertex v, two singleton groups (a G-group and an H-group) are created, with different respective excess values $g(v)$ and $h(v)$. The general path balancing algorithm then performs (at 810) G-combining. Specifically, if $g(G_a) \geq g(G_{a-1})$ where $G_a, G_{a-1}$ are the first two groups in D, the two groups are combined into a single group $G_{a-1} := G_a \cup G_{a-1}$, where the vertices in the single group has a common g-value that is the weighted average of g-values of vertices of the two groups being combined. The G-combining is iteratively performed (by repeating 802-810) until the common excesses of the first two groups are in order or there is only one G-group left. If the G-combining process stops with at least two G-groups in D, as determined (at 814), then the general path balancing algorithm is ready to do the H-combining (at 816).

Otherwise, if less than two G-groups are in D, that means there is now only one G-group $G=G_1$ remaining in the queue D. If $g(G) \geq h(H_1)$, as determined (at 818), which violates the requirement that $g(G)$ be less than any $h(H)$ (see FIG. 7A), all the vertices in $H_1$ are deleted (at 820) from the active part 704 and added to the frozen part 702 (FIG. 7A), with $h(H_1)$ as each vertex's individual excess. The same vertices are also deleted (at 822) from G (by reducing its count and increasing its common excess accordingly).

The H-combining (at 816) is symmetrical to the G-combining (810). Specifically, while $h(H_{b-1}) \geq h(H_b)$, the two groups are combined into a single group, whose h-value is the weighted average of h-values of the previous two groups. The algorithm determines (at 830) if any further vertices are to be processed. If this process stops with at least two H-groups, as determined (at 832), then the process is complete (and proceeds back to step 802). If not, there is now only one H-group $H=H_1$ left. While $h(H) \leq g(G_1)$, as determined (at 834), which violates the requirement that $h(H)$ should have a larger value than any g-value (see FIG. 7A), all the vertices in $G_1$ are deleted (at 836) and added to the frozen part 702, with their common G-value as their excess. The same vertices are also deleted (at 838) from H and $g(H)$ and $n(H)$ are updated (at 840) accordingly. This process will eventually stop with at least one remaining G-group and one remaining H-group.

Note that when vertices in $H_1$ are added to the frozen part, the edge into the group (the group in the frozen part) from the active part is saturated; all excesses of still-active processed vertices will be larger than those of the group. Similarly, when vertices in $G_1$ are added to the frozen part, the edge out of the group into the active part is saturated; all excesses of still-active processed vertices will be smaller than those of the group.

As with the case when using the star balancing algorithm, the path balancing algorithm (monotone or general) is also invoked multiple times by calling the path balancing routine 124 (FIG. 1) multiple times in a loop until some stopping criterion is satisfied. The stopping criterion or stopping rule prevents the loop of repeatedly invoking the balancing routine from running forever. Various types of stopping rules can be employed. One stopping rule involves using a graph search to find an active section and stops when either the sum of positive excesses in the active section is less than one or the sum of negative excesses in the active section is more than minus one. If the sum of positive excesses in the active section is less than one, then all vertices in the active section belong to the sink side of the minimum cut; if the sum of negative excesses in the active section is greater than minus one, then all vertices in the active section belong to the source side of the cut.

To perform the active section search, a forward search is first performed, where the search begins by finding a vertex of positive excess. An arc from the vertex with positive capacity is then identified, such that the search algorithm follows this arc to another vertex, with this process continuing along the vertices until no new vertices can be found. All such vertices that have been identified are marked. Then, a backward search from all marked vertices with negative excess is performed, where vertices visited in this backward search are those marked during the forward search. The active section includes the vertices that are visited during the backward search.

In the monotone path balancing algorithm discussed above, a monotone path is identified. To find monotone paths, the search can be restricted to just the active section to improve efficiency. In finding the monotone path, the search starts with some vertex with positive excess, and the search grows a monotone path from the vertex. The vertices can be visited in a round-robin fashion.

In some embodiments, two alternative techniques can be used to grow a monotone path from a given vertex: (1) find deepest downhill arc; or (2) find good downhill arc.

To find the deepest downhill arc from vertex v, all arcs from v with $r(v, w) > 0$ are visited. The arc with $e(w)$ minimum is selected. To find a good downhill arc, a pointer is maintained from v to one of its adjacent vertices: $p(v)=w$ with $e(w) \leq e(v) - \alpha$ where $\alpha$ is a constant threshold value. Initially $p(v)=$ NULL for all v. Each time a path is to be given from current vertex v, the adjacency list for v is visited, starting from either the head of the list (if $p(v)=$NULL) or the vertex after $p(v)$, and stopping with the first w satisfying $e(w) \leq e(v) - \alpha$ and $(v, w)$ has residual greater than zero. Once w is identified, set $p(v):=w$ and add $(v, w)$ to the current path. The process then attempts to grow the path from w. If w cannot be found, then the process stops and the current path is returned.

Tree Balancing Algorithm

Instead of, or in addition to, using the star balancing algorithm or path balancing algorithm discussed above, a tree balancing algorithm can be used instead, as executed by the tree balancing routine 126 of FIG. 1. Note that a star and a path (as discussed above) are special cases of a tree.

An undirected tree (which includes a collection of vertices of a network) is an undirected, connected graph with no cycle. A directed tree is a directed, connected graph with no cycle, and with a unique root node and every node v has a unique outgoing arc pointing to its parent node $p(v)$. "No cycle" means that no loop is present in a given collection of vertices (tree). "Directed" means that flow occurs only in one particular direction from vertex a to vertex b within the tree.

The following describes two variants of the tree balancing algorithm, according to some embodiments: a first tree balancing algorithm and a second tree balancing algorithm. The first tree balancing algorithm is described first.

Figure 9:
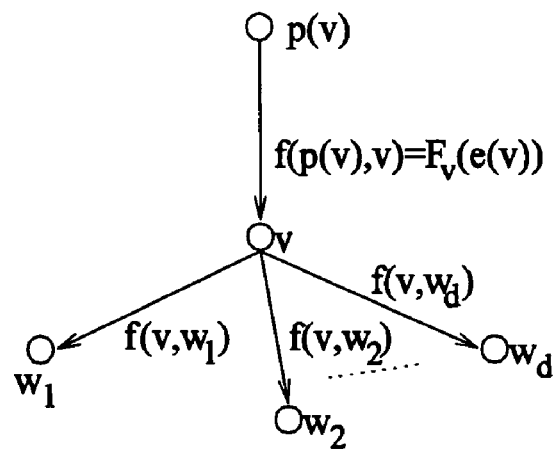
FIG. 9 depicts vertices adjacent to an internal node within a tree, according to an embodiment.

Given an undirected tree, any vertex in the tree can be picked as the root to make the tree a directed tree. The input graph is a rooted tree T with root $r(T)$. Each vertex v of T has a unique parent $p(v)$ and the unique parent of the root is itself. Let $f(p(v),v)$ denote the amount of flow moving from $p(v)$ to v over the residual graph of T, and let $e(v)$ denote the balanced excess value of v given $f(p(v),v)$. Then $f(p(v),v)$ uniquely determines $e(v)$. FIG. 9 depicts a subtree (portion of a tree) to represent vertex v along with a parent $p(v)$ of v and children $w_1, w_2, w_d$ of v.

There exists a function $F_v$ such that $f(p(v),v)=F_v(e(v))$ and $F_v$ is a continuous, monotone increasing, and piecewise linear function of $e(v)$. In other words, with increasing values of $e(v)$, $F_v$ also increases in value in a piecewise linear manner. The domain of $F_v$ is $[a(v),b(v)]$ (the possible values of $F_v$ range between $a(v)$ and $b(v)$), where $a(v)$ denotes the minimum possible excess value of vertex v, and $b(v)$ denotes the maximum possible excess value of vertex v. The value $a(v)$ corresponds to $f(p(v),v)=-r(v,p(v))$ and the value $b(v)$ corresponds to $f(p(v),v)=r(p(v),v)$. Note that $r(p(v),v)$ is the residual capacity from $p(v)$ to $(v)$. Furthermore, the domain of $F_v$ is partitioned into consecutive intervals and the endpoints of these intervals are enumerated as $$a(v)=x_1(v)<x_2(v)<\ldots<x_{l_v}(v)=b(v),$$

where $x_i$ (i=1 to $l_v$) represents interval endpoints, and $l_v$ denotes the total number of interval endpoints for the domain of $F_v$. Note that $l_v \leq 2n_v$ for each vertex v, where $n_v$ denotes the number of nodes in the subtree rooted at v. $\tilde{F}_v$ is used to denote the extension of $F_v$ to the domain $(-\infty, \infty)$: $\tilde{F}_v(x)=F_v(x)$ when $x \in [a(v), b(v)]$, $\tilde{F}_v(x)=-r(v,p(v))$ when $x \in (-\infty, a(v))$, and $\tilde{F}_v(x)=r(p(v),v)$ when $x \in (b(v), \infty)$.

The first tree balancing algorithm generally involves three steps, with the first step initializing $F_v$ for all leaf nodes (vertices other than the root vertex), the second step computing all $F_v$ using a bottom-up procedure, and the third step deducing all flow values and excess values over T using a top-down procedure.

Figure 10:
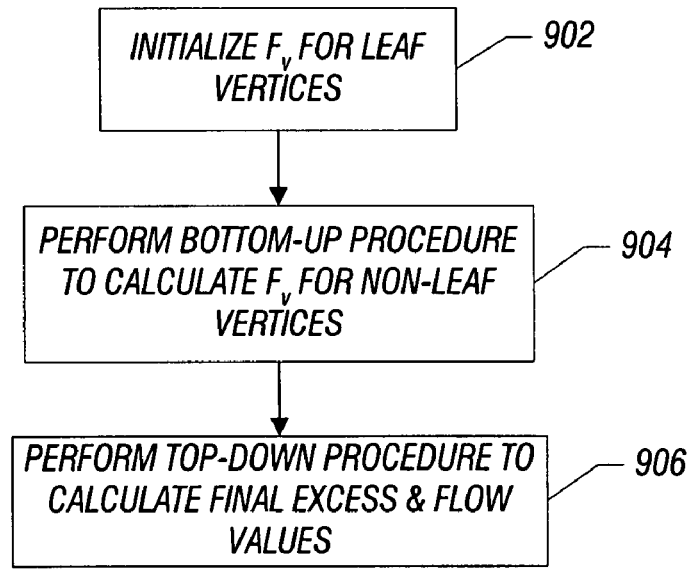
FIG. 10 is a flow diagram of a process for a tree balancing algorithm, according to an embodiment.

As depicted in FIG. 10, $F_v$ is initialized (at 902) for each leaf node v (vertex with no child, such as $w_1$, $w_2$, $w_d$ in FIG. 9). For a leaf node v, $f(p(v),v)=e(v)-e_0(v)$ where $e_0(v)$ is the initial excess of node v. Given that $-r(v,p(v)) \leq f(p(v),v) \leq r(p(v),v)$, $e(v) \in [a(v), b(v)]$, where $a(v)=e_0(v)-r(p(v),v)$, $b(v)=e_0(v)+r(p(v),v)$. Therefore $F_v(x)=x-e_0(v)$ for $x \in [a(v),b(v)]$ if v is a leaf node (a leaf node is a vertex with no child).

Next, using the bottom-up procedure (at 904) $F_v$ is computed for each non-leaf node v based on a known $F_w$ for each child w of v. Note that the $F_v$ function was computed for leaf nodes in the initialization step (902). The flow conservation condition guarantees that $$f(p(v),v)+e_0(v)=e(v)+\Sigma_w f(v,w), \text{ i.e.,}$$

$$F_v(e(v))=f(p(v),v)=e(v)-e_0(v)+\Sigma_w f(v,w)=e(v)-e_0(v)+\Sigma_w F_w(e(w)). \quad \text{(Eq. 3)}$$

For a fixed child w of non-leaf vertex v, by the definition of the balanced pseudoflow, if $e(w) \neq e(v)$, either (v, w) is saturated or (w, v) is saturated; in other words, if $e(w) \neq e(v)$, then $e(w)=a(w)$ or $e(w)=b(w)$. Thus, the excess of child vertex w, $e(w)$ is uniquely determined by $e(v)$ as follows:

$$e(w) = \begin{cases} e(v) & \text{if } e(v) \in [a(w), b(w)] \\ a(w) & \text{if } e(v) < a(w) \\ b(w) & \text{if } e(v) > b(w) \end{cases} \quad \text{(Eq. 4)}$$

By the definition of $\tilde{F}_v$, Eq. 4 translates into $$F_v(x)=x-e_0(v)+\Sigma_w \tilde{F}_w(x) \text{ when } x \in [a(v),b(v)]. \quad \text{(Eq. 5)}$$

The interval endpoints of $F_w$ for the children w of non-leaf vertex v are candidate endpoints of $F_v$. By restricting $F_v(e(v))$ to the range $[-r(v,p(v)), r(p(v),v)]$, this further restricts the domain of $F_v$ to a finite interval $[a(v),b(v)]$ and it adds two extra endpoints to the domain of $F_v$.

If non-leaf vertex v has $d_v$ children $w_1, w_2, \ldots, w_{d_v}$, $L_{w_k}$ is used to denote the sorted list of all interval endpoints of functions $F_{w_k}$ for $1 \leq k \leq d_v$ of child vertices w. The algorithm walks through lists $L_{w_k}$ (sorted lists associated with children vertices $w_k$) for all k child vertices simultaneously. In the walk through the lists $L_{w_k}$, the algorithm traverses through multiple steps corresponding to the number of intervals in the lists (in other words, the algorithm traverses through steps i, where i equals 1 to some value representing the number of intervals in the lists). At step i (i represents the current step in the walk-through of the sorted lists), each list has a current endpoint (of the interval associated with step i), and the minimum over all the interval endpoints becomes $x_i(v)$, the i-th endpoint of $F_v$.

In other words, the minimum of the endpoints of the intervals in respective sorted lists of children $w_k$ at step i is used as the interval endpoint for the corresponding interval of $F_v$ (associated with the non-leaf vertex currently being considered by the algorithm). After the current interval endpoint of list $L_{w_k}$ is selected to be the corresponding interval endpoint of $F_v$, the algorithm moves to the next interval of the sorted lists $L_{w_k}$ ($1 \leq k \leq d_v$), and the procedure is repeated until all interval endpoints for $F_v$ have been determined based on the sorted lists for child vertices $w_1, w_2, \ldots, w_{d_v}$.

The procedure is explained in further detail as follows. Initially $x_0(v)=-\infty$ and $x_1(v)=\min_i a(w_i)$, where vertex v is the non-leaf vertex being considered. For $e(v) \in (-\infty, x_1(v)]$, $$F_v(e(v))=e(v)-e_0(v)-\Sigma_k r(w_k,v) \quad \text{(Eq. 6)}$$

because $e(v)<a(w_k)$ for all k. During the walking process, at step i the algorithm moves from $x_{i-1}(v)$ to $x_i(v)$, and moves from the previous domain interval $[x_{i-1}(v),x_i(v)]$ of $F_v$ to the current interval $[x_i(v), x_{i+1}(v)]$ of $F_v$. If $x_i(v)=x_j(w_k)$ for some child $w_k$, then the change of $F_v(x)$ equals to the change of $F_{w_k}(x)$ from interval $[x_{j-1}(w_k), x_j(w_k)]$ to interval $[x_j(w_k),x_{j+1}(w_k)]$. So the algorithm can compute $F_v(x)$ over $[x_i(v),x_{i+1}(v)]$ in constant time. To extract the minimum value among $d_v$ numbers efficiently, the algorithm can build a heap over these numbers. Then it takes time $O(\log d_v)$ to extract the minimum value from the heap. After $x_i(v)=x_j(w_k)$ is processed, $x_j(w_k)$ is removed from the heap and $x_{j+1}(w_k)$ is inserted into the heap. The total processing time for computing $F_v(x)$ is thus $O(n_v \log d_v)$.

Once functions $F_w$ for all children w of the root r=r(T) have been computed (902, 904), a top-down procedure is performed (at 906) to determine excess and flow values in the tree T. It is assumed that root vertex r has a parent p(r) with $c(p(r),r)=c(r,p(r))=0$ (capacity of arcs between p(r) and r in both directions is zero). This results in the function $F_r$ corresponding to root vertex r becoming a singleton function with its domain containing a single value $e^*(r)$, where $e^*(r)$ is the final excess value of the root r. And $e^*(r)$ can be computed by solving the equation $F_r(e^*(r))=0$.

Once the final excess value $e^*(r)$ for the root vertex of the tree T is known, as computed above, then the algorithm walks top-down over the tree starting from the root. Once the algorithm has obtained the final excess value $e^*(v)$ for vertex v under the root vertex r, the algorithm can deduce the value $e^*(w)$ uniquely for each child w of v based on Eq. 4 above, and furthermore, the flow value f(v, w) based on Eq. 3 above. Thus, from the top down, the algorithm can easily compute the final excess values and flow values for all vertices and edges of the tree. The final excess and flow values correspond to a balanced pseudoflow over the tree subgraph. The tree balancing algorithm is iteratively performed for remaining trees in the network by repeatedly invoking the tree balancing routine.

Alternatively, instead of using the first tree balancing algorithm discussed above, a second tree balancing algorithm can be used instead, which has a faster worst-case running time. The idea is to store all endpoints of the domain of $F_v$ in a balanced binary search tree $S_v$ for each node v instead of a sorted list used in the first tree balancing algorithm. During the bottom-up procedure, the binary search tree $S_v$ for each vertex v is constructed based on $S_w$ for all children w. Given non-leaf vertex v and all its children, the algorithm identifies one child $w_0$ with the largest subtree size $n_{w_0}$, and inserts interval endpoints from other children into $S_{w_0}$ to build $S_v$. Further details of the second tree balancing algorithm are provided below.

Each node q of the binary search tree $S_v$ corresponds to an interval endpoint of the domain of $F_v$, with its key x(q) equal to the interval endpoint value. Given non-leaf vertex v, during the bottom-up procedure, assume that $w_0, w_1, \ldots, w_{d_v-1}$ are all the children of v, with subtree size $n_{w_0}$ the largest among all the children. At each node q, besides its key value, the algorithm also stores the linear function $F_v^q(x)=F_v(x)$ over the interval [x(q), x(q')] where q' is the successor of q in $S_v$. Let $F_v^q(x)=a_v^q \cdot x+b_v^q$, then only two integers $a_v^q$, $b_v^q$ for each node q have to be stored in the binary search tree $S_v$. Instead of storing $a_v^q$ explicitly at node q in the binary search tree $S_v$, the algorithm can store the value $\Delta a_v^q=a_v^q-a_v^{p(q)}$ at q where p(q) is the parent node of q in the binary search tree $S_v$. If q is the root of $S_v$, then $\Delta a_v^q=a_v^q$. Similarly the algorithm stores $\Delta b_v^q=b_v^q-b_v^{p(q)}$ instead of $b_v^q$ at q. Storing the Δ values instead of the $a_v^q$, $b_v^q$ values results in more efficient updates of stored parameter values (for example, to add a constant to $a_v^q$ for all nodes q in $S_v$, it is sufficient to just modify $\Delta a_v^r$ for the root r of $S_v$. Based on the above, $$F_v^q(x)=(\Sigma_o \Delta a_v^o)x+(\Sigma_o \Delta b_v^o),$$

where o is over all the nodes in the path from q to the root of $S_v$. $F_v^q$ is stored implicitly, which takes time O(log n) to evaluate over any interval in its domain.

To construct $S_v$ for the non-leaf vertex v under consideration, the algorithm starts with $S_{w_0}$ and inserts interval endpoints from other search trees (of children vertices of non-leaf vertex v) into $S_v$. Each insertion operation keeps invariant the function value of each node of the binary search tree, and it is easily realized by taking care of the invariant during the left-rotation and right-rotation operations for balanced binary search trees. Similarly as before, the algorithm walks through each search tree $S_{w_k}$ sequentially for $k=1, \ldots, d_v-1$. For a fixed $S_{w_k}$, the algorithm starts with its minimum key value $x_0(w_k)$, and after $x_{j-1}(w_k)$ is inserted into $S_v$, the current endpoint moves to $x_j(w_k)$. Among at most $d_v-1$ candidate endpoints one from each search tree, the algorithm selects the one with the minimum value and inserts the minimum value into the current tree $S_v$.

The following describes how the insertion mentioned above works. From Eq. 4 above, the function $(x-e_0(v))$ is added to $F_v^p(x)$ for every node q of $S_v$. To do so, the algorithm updates the root $r=r(S_v)$: $\Delta a_v^r := \Delta a_v^r+1$, $\Delta b_v^r := \Delta b_v^r-e_0(v)$. The algorithm takes care of the boundary interval $(-\infty, x_1(w_0))$ by inserting $-\infty=x_0(v)$ to $S_v$ and sets its function value to $-\Sigma_w r(w,v)$; for $(x_{l_{w_0}}, \infty)$, the algorithm updates the function value of the last node to $\Sigma_w r(v,w)$. At the i-th step, the algorithm inserts $x_i(v)=x_j(w_k)$ into $S_v$ where $k=1, \ldots, d_v-1$. After $x_i(v)$ is inserted, $F_v$ is updated as follows:

(1) For each q of $S_v$ with $x(q) \geq x_i(v)$, its $F_v$ value is modified by an amount $F_{w_k}^j(x)-F_{w_k}^{j-1}(x)$ where j corresponds to the node in $S_{w_k}$ with value $x_j(w_k)$, and j−1 corresponds to the predecessor of j in $S_{w_k}$ with value $x_{j-1}(w_k)$.

(2) Let $q_0$ be the node from $S_{w_0}$ with $x(q_0)$ the largest and $x(q_0)<x_i(v)$. Let q be the node inserted into $S_v$ with key value $x_i(v)$. The algorithm adds $F_{w_0}^{q_0}$ to $F_v^q$. It may not be easy to find $q_0$ because $S_{w_0}$ is modified with many inserted values now. The following trick is enough for our purpose: keep track of $q_0$ during the insertion process; and find the predecessor of q in $S_v$, if it is in $S_{w_0}$, replace $q_0$ with this predecessor.

The foregoing procedure involves updating a block of consecutive nodes by adding the same function to all function fields of these nodes. Given that these functions are all linear functions with two coefficients, it is enough to show how to add a constant to the same field of all the consecutive nodes in a block.

Figure 11:
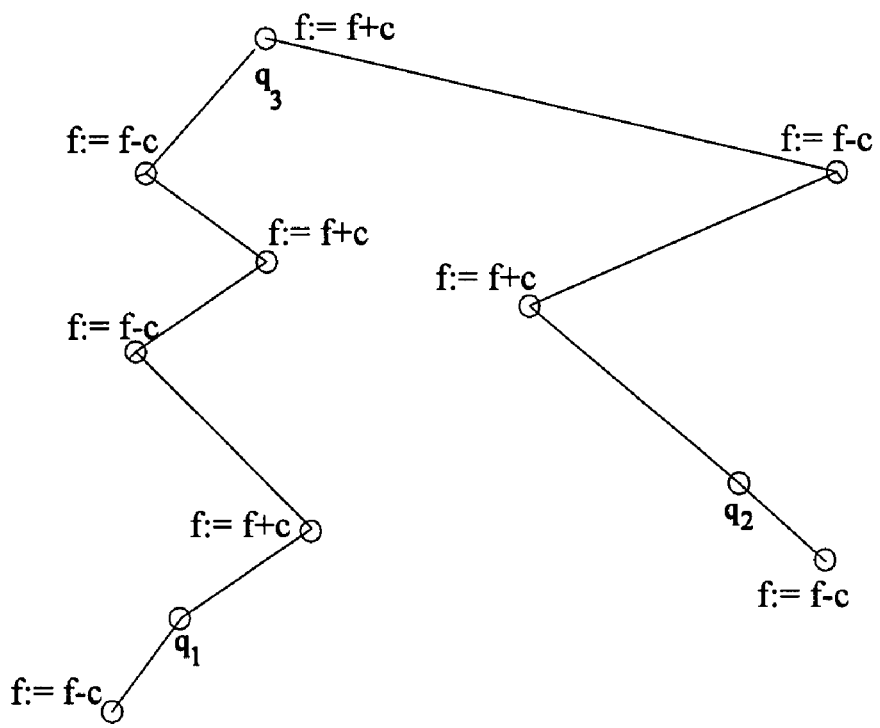
FIG. 11 depicts a binary search tree for use with a variant of the tree balancing algorithm, according to an alternative embodiment.

As depicted in FIG. 11, let $q_1$ denote the leftmost node and $q_2$ the rightmost node in the block, and $q_3$=lca($q_1,q_2$) the least common ancestor of $q_1, q_2$. Effectively, the path from $q_1$ to the least common ancestor ($q_3$) and the path from $q_2$ to the least common ancestor ($q_3$) intersect at $q_3$.

Let f denote the field of each node to be updated, and Δf denote the difference between the f field value of this node and its parent. FIG. 11 illustrates how to add a constant c (where constant c represents the function to be added to all nodes of the binary search tree discussed above) to the f field of all nodes with key values in the range [x($q_1$), x($q_2$)] by updating O(log n) Δf values.

Let path₁ be the path from $q_1$ to $q_3$, path₂ be the path from $q_2$ to $q_3$. First c is added to Δf of $q_3$. Next the algorithm walks down path₁ from $q_3$ following its left child (lc). For the first time, the algorithm moves from a node q to rc(q) (right child of q), where −c is added to the Δf field of q. After that the algorithm walks down the path through its right child. For the first time when the algorithm moves from q to lc(q) (left child of q), the algorithm adds c to the Δf field of q. Similar but symmetric operations will apply to the walking down process for path₂.

After all interval endpoints are inserted into $S_v$, the algorithm computes a(v) and b(v), the minimum and maximum excesses, respectively, of e(v), and removes all nodes with key values either less than a(v) or more than b(v). The following describes how to compute a(v) and remove nodes with key values less than a(v). The case for b(v) is handled similarly and thus not described.

By definition, $F_v(a(v))=-r(v,p(v))$. To find a(v)∈[x(q), x(q')) for node q and its successor q', the algorithm walks down the tree starting from the root. When a node q is visited, the algorithm evaluates $F_v(x(q))$ as well as $F_v(x(q'))$. If $F_v(x(q))<-c(v,p(v))$, then a(v)<x(p) and the algorithm moves from q to lc(q). If $-r(v,p(v))\in[F_v(x(q)),F_v(x(q')))$, the algorithm stops and returns q. If $F_v(x(q')) \geq -r(v, p(v))$, the algorithm moves from q to rc(q). Once the algorithm finds the correct q, a(v) can be computed through $F_v^q(a(v))=-r(v,p(v))$. After a(v) is computed, the algorithm replaces the key value of q by a(v). Next the algorithm removes all nodes with key values less than a(v). This actually corresponds to splitting $S_v$ into three parts ($S_v^l, q'', S_v^r$), where q'' is the predecessor of q, $S_v^l$ is a search tree containing all nodes with key values $\leq x(q'')$, and $S_v^r$ corresponds to a search tree containing all key values $\geq a(v)$. After the split operation, $S_v$ is replaced by $S_v^r$. Details about how to perform the split operation for red-black trees are provided in Guibas & Sedgewick, "A Dichromatic Framework for Balanced Trees," Proceedings of the 19th Annual Symposium on Foundations of Computer Science, pp. 8-21 (1978). The split operation becomes trivial if the splay tree is used, as described in Sleator & Tarjan, "A Data Structure for Dynamic Trees," pp. 362-391 (1983), which is simpler than red-black trees and the split operation is trivial after performing a splay operation.

After binary search trees $S_v$ for the vertices are constructed bottom-up before reaching the root of T, the algorithm next computes the flow values for all edges and excess values for all vertices. Because $S_w$ for some vertices w are modified during the bottom-up process, the algorithm applies a slightly different procedure here compared to the top-down procedure described for the first tree balancing algorithm. One naive way is to keep track of all the insertion information and reconstruct $S_{w_0}$ from $S_v$, assuming that $w_0$ is the largest child of v and $S_{w_0}$ is modified during the bottom-up procedure. A better approach uses two steps, in which the first step deduces all the excess values from the top down, and the second step deduces all the flow values from bottom up. Details regarding the two-step process are provided below.

The algorithm first obtains e*(r), the final excess value of root vertex r=r(T), since e*(r)=a(r)=b(r) for the balanced flow. During the top-down procedure, once e*(v) is determined, for child w of v with a(w), b(w) known, the algorithm can deduce the value of e*(w) uniquely using Eq. 4 above. In the second step, the algorithm deduces all the flow values from bottom up. For each leaf node, given its final and original excess values, the algorithm can deduce the flow value for the edge connecting it and its parent. Given a vertex v, once f(v, w) is known for each child w of v, the algorithm can deduce f(p(v), v) based on the flow conservation condition (Eq. 3 above).

The foregoing referred to balancing trees in the network. The following describes how trees can be identified. There are various ways to find a tree subgraph from the current residual graph (the network with residual arc capacity for each arc). The following describes one method that is similar to a greedy method to construct a minimum spanning tree. The edge value of each edge {v, w} is defined as $$\max\left\{\min\left(\frac{e(v)-e(w)}{2}, r(v,w)\right), \min\left(\frac{e(w)-e(v)}{2}, r(w,v)\right)\right\}. \quad \text{(Eq. 7)}$$

The edge value defined by Eq. 7 is non-negative, and it actually represents the maximum possible excess one can move from one vertex to the other to balance the edge. There are other methods to assign values to edges, and a few good candidates are listed below:

$\min\{|e(v)-e(w)|, r(w,v)+r(v,w)\}$, or $\max\{r(w,v), r(v,w)\}$ or $r(w,v)+r(v,w)$ Once the edge values for all the edges are defined and calculated, then a spanning tree can be constructed as follows: start with the empty edge set and all the vertices; add edges one by one into the current edge set with non-increasing edge values without introducing cycles; stop when a connected tree is obtained for all the vertices.

Finding Minimum Cut

Once network balancing has been performed using one of the techniques described above, the post-processing (212 in FIG. 2) is performed. The post-processing includes finding a minimum cut. If when the balancing procedure stops there are no further possible balancing moves in the flow network, then a minimum cut S(0) has been found. S(0) represents the set of vertices v where e(v)>0. However, if arc capacities are integers and one of the stopping rules (discussed below) is used, further analysis is performed to find a minimum cut, since additional balancing moves are still possible. The following discusses how to obtain the minimum cut when different stopping rules are used.

As discussed above, one stopping rule is that the balancing procedure stops when either the sum of positive excesses in the active section is less than +1, or the sum of negative excesses in the active section is greater than −1. For the first case where the sum of positive excesses in the active section S(a, b) is less than 1, then all nodes in the active section belong to the sink side of the cut, i.e., the source cut X=S(b). For the second case where the sum of negative excesses in the active section is more than −1, all nodes in the active section belong to the source side of the cut, i.e., the source cut X=S(a). A discussion of "active section S(a, b)" and the "source cut S(b)" is provided in U.S. Ser. No. 11/450,706, referenced above.

Figure 12:
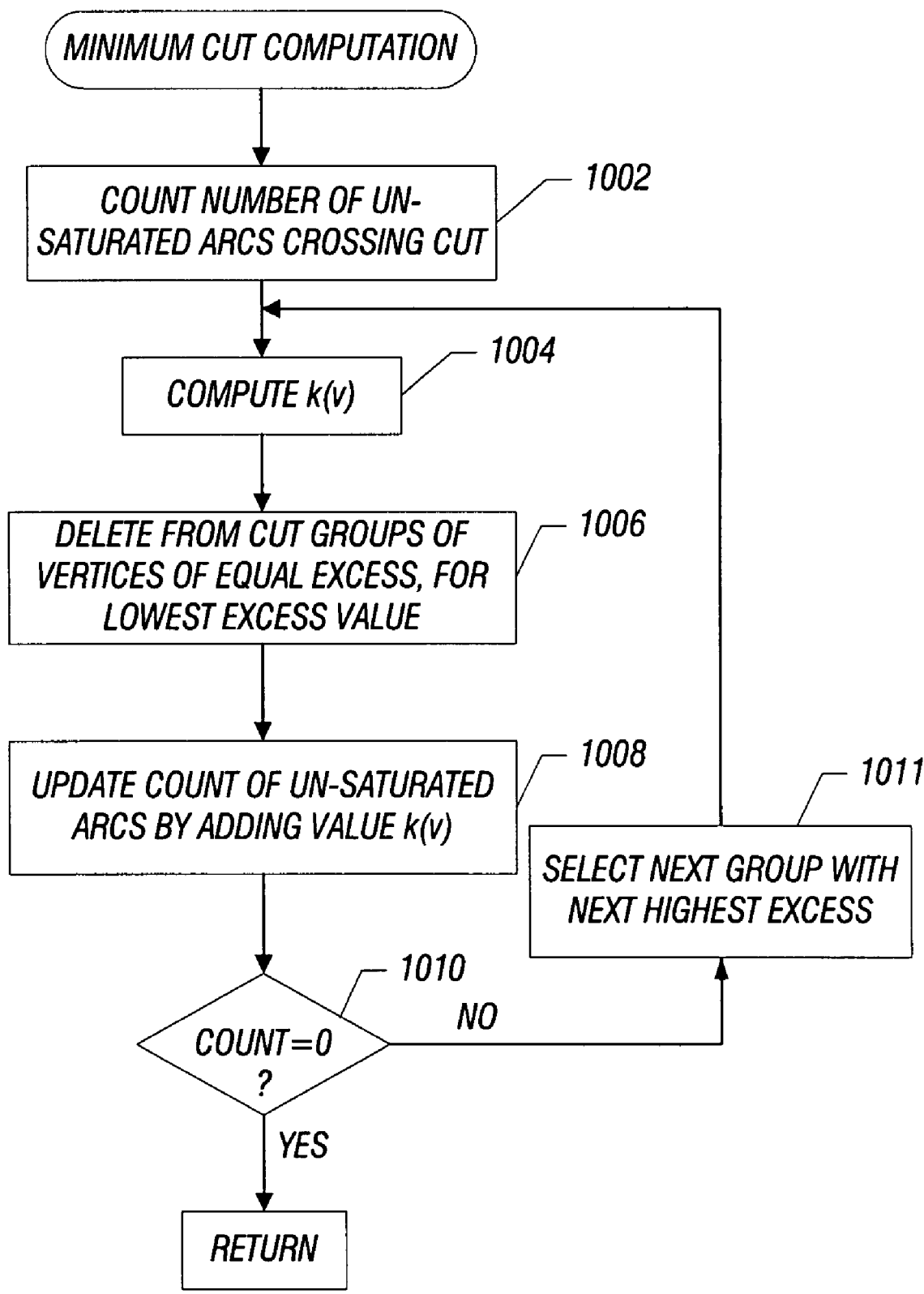
FIG. 12 is a flow diagram of a process of determining a minimum cut in the network, according to an embodiment.

Another stopping rule is that there are no α-active arcs for $\alpha=1/n^2$. In this case, the following is performed. Computing the minimum cut is depicted in FIG. 12. Once the balancing procedure 210 (FIG. 2) stops, the minimum cut is found by finding the cut S(b) such that b is a minimum non-negative real value and such that S(b) is saturated. The algorithm starts with S(0)={v|e(v)>0}, where X=S(0) and Y=V−X. Y represents all vertices in set V not in X. Computing the minimum cut is performed by successively moving vertices from X to Y until no further unsaturated arcs cross the cut (X, Y), at which point the cut (X, Y) is the minimum cut. Cut (X, Y) represents the partition that divides V into X and Y.

The algorithm performed by the analysis software module 112 makes a pass over the arcs of the network or just arcs inside the active section, and attempts to find new canonical cuts based on a counting method. It counts (at 1002) the number of unsaturated arcs crossing a cut (X, Y), where X is the side containing the source node. This number is referred to as COUNT.

The algorithm next computes (at 1004) a number k(v) for each vertex v (inside the active section). The number k(v) is equal to the number of unsaturated arcs (u,v) with e(u)>e(v), minus the number of unsaturated arcs (v,w) with e(v)>e(w). Note that it is possible that k(v) is negative. For all vertices v, the vertices are sorted according to increasing excess values and the vertices are grouped into equal-excess value groups $G_1, \ldots, G_k$, where each group $G_i$ has vertices of equal excess value. The algorithm deletes (at 1006) from X a group of one or more vertices v of equal excess, starting with the group associated with the lowest excess value. Deleting a vertex v from the side X means that the vertex v is moved from the side X in the network containing the source vertex to the side Y in the network containing the sink. The goal of the algorithm is to successively delete from the side X groups of vertices v of equal excess in increasing order by excess, until the number of unsaturated arcs crossing the cut (X, Y) is zero, which implies that a new canonical cut has been found and the algorithm can stop. The updated X is now X=S(b) where $b=e(G_i)$ and $e(G_i)$ being the excess value associated with group $G_i$.

Next, the algorithm updates (at 1008) the count of the unsaturated arcs crossing the current cut X by adding the value k(v). The algorithm next determines (at 1010) if the count (COUNT) of unsaturated arcs crossing the cut X is equal to zero. If not, then the next group (the group with the next higher excess value) is selected (at 1011) and tasks at 1004, 1006, and 1008 are repeated to move the next group of one or more vertices from X to Y. If the count of unsaturated arcs crossing X is equal to zero, as determined at 1010, then the minimum cut, S(b) where $b=e(G_i)$, has been found and the algorithm can return. Note that the process of FIG. 12 will stop with a saturated cut (the minimum cut) at least by the time all vertices with excess less than +1 are deleted from X, assuming that the active section contains only vertices with excess less than +1.

In an alternative implementation, in which the stopping rule specifies that the algorithm stops when there is no available α-move, then the vertices to be considered for deletion from the cut X can be restricted to those with positive excess at most 1/n.

Finding Maximum Flow

Figure 13:
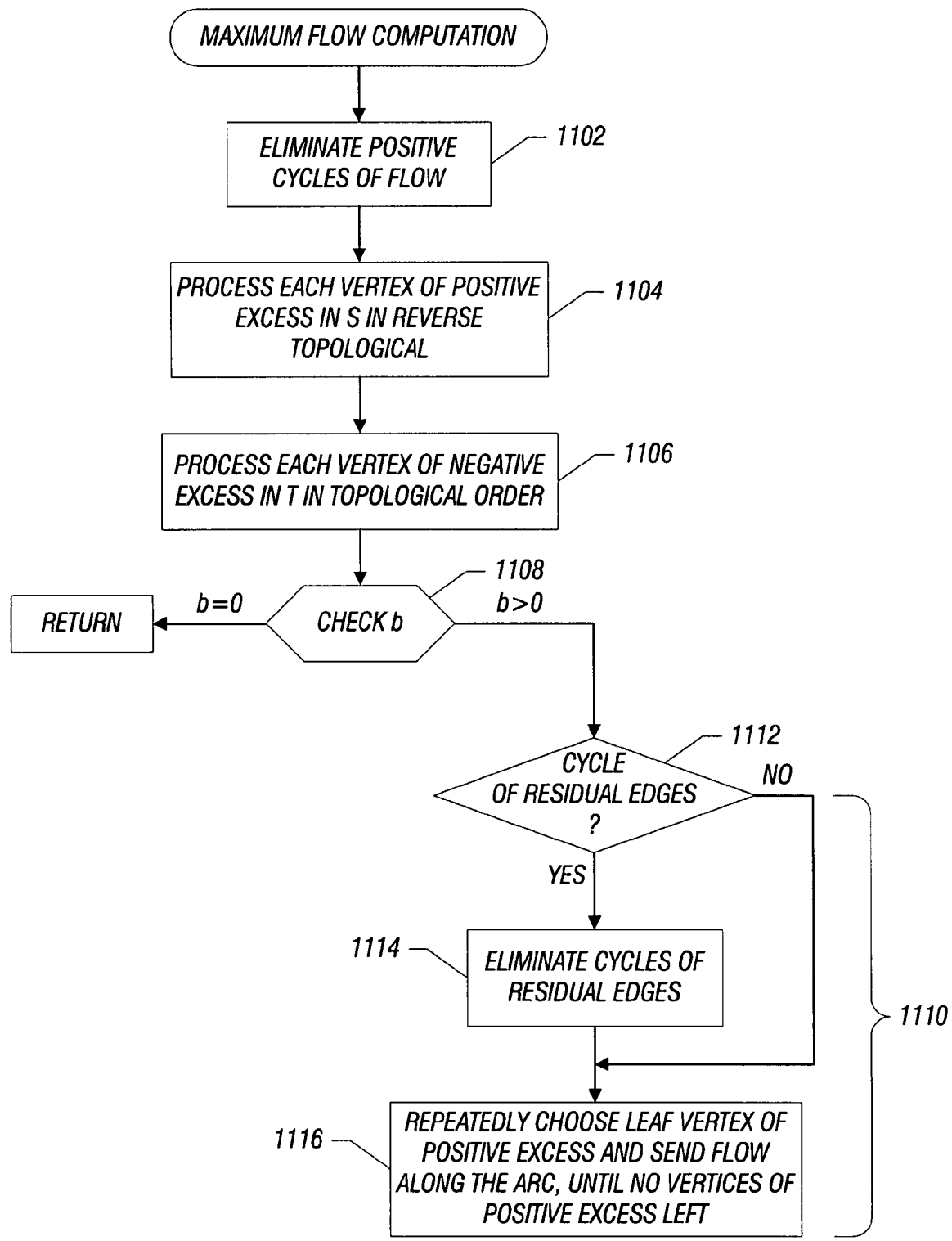
FIG. 13 is a flow diagram of a process of determining a maximum flow in the network, according to an embodiment.

Once the minimum cut has been found, the algorithm in some embodiments can proceed to find the maximum flow. FIG. 13 illustrates a process for finding the maximum flow, in accordance with some embodiments. Given a minimum cut S=S(b), the pseudoflow in the network is made acyclic by eliminating (at 1102) positive cycles of the flow. A positive cycle of flow refers to a cycle that includes two or more vertices and arcs connecting to two or more vertices that cause flow to flow in a cycle (and hence cyclic flow is present in the network). One technique for eliminating positive cycles of flow is described in Sleator & Tarjan, referenced above.

Next, the algorithm processes (at 1104) each vertex v of positive excess, e(v)>0, in the minimum cut S in reverse topological order. Reverse topological order in the minimum cut S refers to starting with the vertex v of positive excess that is furthest downstream of the source vertex s. The processing performed at 1104 starts with this vertex v that is a positive excess that is furthest away from the source vertex, and proceeds backwards towards the source vertex to process each vertex of positive excess. Generally, reverse topological order refers to any order such that if (v,w) is an arc, vertex w precedes vertex v. The processing performed at 1104 is as follows: the flow on successive arcs into vertex v is reduced until the excess, e(v), is reduced to zero.

Similarly, on the other side of the minimum cut, in the section T=V−S, each vertex of negative excess is processed (at 1106) in topological order. In general, the topological order refers to any order such that if (v,w) is an arc, vertex v precedes vertex w. Note that the section T is the section that includes the sink vertex t. Processing of vertices having negative excess in T refers to beginning with the vertex of negative excess that is furthest upstream of the sink vertex. In the processing performed at 506, flow on successive arcs out of vertex v is increased until the excess, e(v), is increased to zero.

The computations performed at 1102, 1104, and 1106 cause all positive excesses in the minimum cut S to be reduced to zero, and to eliminate all negative excesses in V−S (T), without changing the flow on any arc crossing the minimum cut S. The algorithm determines (at 1108) if b is equal to zero. If so, then the pseudoflow is now a flow that saturates the cut S; as a result (implied by the maximum flow minimum cut theorem), the flow is a maximum flow and the cut S is a minimum cut.

However, if b>0, then further processing (at 1110) has to be performed. Note that the sink-side section T may include positive excess vertices that have to be eliminated. To do so, the algorithm searches (at 1112) for cycles of residual edges.

A "residual edge" is an edge $\{v,w\}$ such that v and w are in T and $f(v,w)$ is not an integer. If $\{v,w\}$ is a residual edge, both (v,w) and (w,v) are unsaturated, since both c(v,w) and c(w,v) are integers. If v is a vertex of zero excess in T, v is incident either to zero or to at least two residual edges. If v is a vertex of positive excess in T, v is incident to at least one residual edge. If there is a cycle of residual edges, the algorithm eliminates (at 1114) the cycle of residual edges. Each occurrence of a cycle of residual edges is eliminated. To eliminate a cycle of residual edges, the algorithm sends (increases or decreases) flow along the cycle (in either direction) to make at least one of the cycle's edges not residual, by making integral the flow on the corresponding pair of arcs. This will increase or decrease the flow on various arcs, but it creates no new residual edges. The technique of eliminating cycles of residual edges is similar to the technique described in Sleator & Tarjan, referenced above. Once there are no cycles of residual edges, the residual edges form a forest, every leaf of which is either the sink vertex t or a vertex of positive excess.

The algorithm repeatedly chooses (at 1116) a leaf v of positive excess and sends flow along the arc corresponding to the incident residual edge. This will both reduce the excess to zero and eliminate the residual edge, and it preserves the property that the sum of positive excesses is less than +1. Task 1116 is repeated until there are no vertices of positive excess. In some embodiments, the number of cycles and arcs along which flow must be moved in the further processing 1110 is at most m.

The resulting maximum flow may still contain fractional flows on the source side S (the minimum cut). If desired, the flow can be converted into an integral flow by using the method in the further processing 1110 to eliminate cycles of residual edges (and thereby all residual edges) on the source cut S. Making a flow integral refers to eliminating arcs having fractional flows.

The cut S(b) chosen by the algorithm for computing the maximum flow is such that S(a,b) is the active section. If the algorithm stops because the sum of the negative excesses in the active section is greater than −1, but the sum of positive excesses in the active section is greater than +1, then the cut S(a) is chosen instead, and the maximum flow computation is modified to eliminate the negative excesses in S(a).

Parametric Bipartite Minimum Cut

The following describes application of the balancing procedure according to some embodiments to the problem of computing a complete set of nested minimum cuts in a parametric bipartite network. However, instead of balancing vertex excesses as discussed above, parameter values are balanced.

Figure 14:
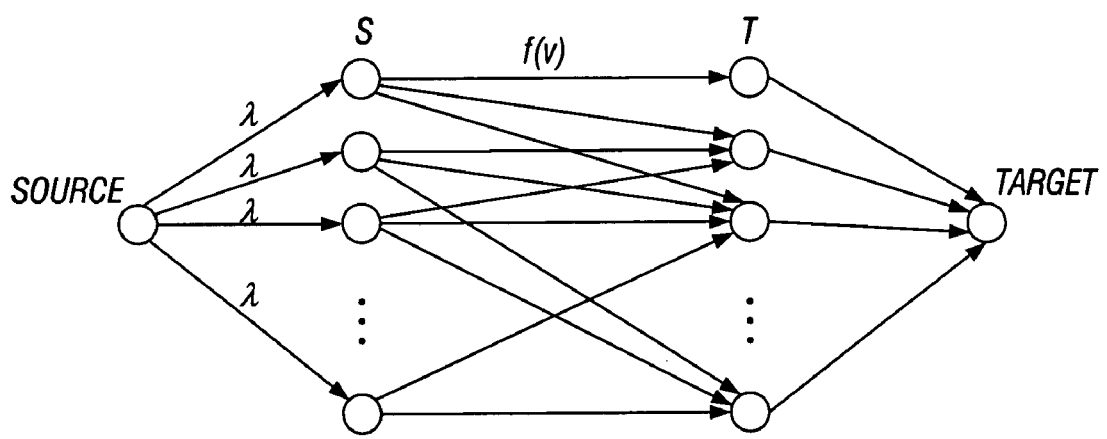
FIG. 14 depicts a parameterized bipartite network in which a technique according to some embodiments is applicable.

As depicted in FIG. 14, a bipartite network is a bipartite graph that includes a set of supply vertices S, a set of demand vertices T, a set of arcs, each of which leads from a vertex in S to a vertex in T, and a non-negative supply-demand function d on the vertices. A vertex v is referred to as a supply vertex if it is in S and a demand vertex if it is in T. If v is a supply vertex, d(v) is its supply; if v is a demand vertex, d(v) is its demand. If f is a real-valued function on the arcs and v is a vertex, $f(v)=\Sigma_w f(v,w)$ if v is a supply vertex, and $f(v)=\Sigma_u f(u,v)$ if v is a demand vertex. A cut X is an arbitrary subset of the vertices with capacity $\Sigma\{d(v)|v$ is a supply vertex not in X or v is a demand vertex in X$\}$. A cut is minimum if it has minimum capacity. A parametric bipartite network is a parametric network in which the demands are fixed, but the supplies are non-negative non-decreasing functions $d(v, \lambda)$.

The following discussion considers the identity function $d(v, \lambda)=\lambda$. Note that it is possible to extend the vertex balancing algorithm to general continuous supply functions including piecewise linear functions.

For any fixed value of $\lambda$, a parametric network has a minimum cut. The problem considered is that of computing not just one such cut or flow but such a cut for every possible value of $\lambda$. Given a flow, an augmenting path is a path of arcs, each of which is either an arc of the network or is the reversal of an arc in the network having positive flow. All the supplies are replaced with ∞. Now any maximum flow has value equal to the sum of the demands. A flow $f$ is balanced if there is no augmenting path from a supply vertex u to another supply vertex v such that $f(u)<f(v)$. If f is a balanced maximum flow, for any fixed value $\lambda$, it can be shown that $S(\lambda)=\{v|v$ is a supply vertex with $f(v)\leq\lambda\}\cup\{w|w$ is a demand vertex with $(v,w)>0\}$ is a minimum cut. Thus the balanced flow gives all the nested minimum cuts for the parametric bipartite graph.

Thus the problem becomes the computation of a balanced maximum flow.

A demand vertex w is unbalanced if there are two arcs (u, w) and (v, w) such that $f(u)<f(v)$ and $f(v, w)>0$. The vertex-balancing algorithm involves finding an initial maximum flow and repeating the following until there are no unbalanced demand vertices, or until a suitable stopping criterion holds. Let w be an unbalanced demand vertex. Let V be the set of vertices v such that (v, w) is an arc. For each vertex v in V, let $g(v)=f(v)-f(v, w)$; this is the flow into v that goes to vertices other than w. Next, a value $\gamma$ (this is the final excess value $e^*(v)$ discussed above) is determined, and V is partitioned into two sets Y and Z such that (i) $g(y)<\gamma \leq g(z)$ for all $y \in Y$ and $z \in Z$; and (ii) $\Sigma_{y \in Y}(\gamma-g(y))=c(w,t)$. The flows on the arcs into the vertices in V are modified, and from the vertices in V to w, so that $f(y)=\gamma$ if $y \in Y$ and $f(z)=g(z)$ if $z \in Z$.

A vertex balancing operation on w reallocates the flow entering w so that it comes from the vertices v of smallest g(v); all the small ones end up with equal total flow f(v) and all the large ones end up with no flow into w. The values $\gamma$, Y, and Z involved in a vertex balancing step are computed in time linear in the degree of w using a binary search process, as follows. In general V will be partitioned into three sets, X, Y, and Z, such that $g(y)<g(x)\leq g(z)$ for all vertices y, x, z in Y, X, Z respectively, and Y and Z are subsets of the final Y and Z. The procedure maintains $\Sigma_{y \in Y}g(y)$. Initially X=V and Y and Z are empty. The general step includes choosing a vertex $x \in X$, finding $U=\{u \in X | g(u)<g(x)\}$, and trying g(x) as a value for $\gamma$, by comparing $\Sigma\{(g(x)-g(y)) | y \in Y \cup U\}$ to c(w, t). If they are equal, the algorithm stops with $\gamma=g(x)$, $Y \cup U$ and $Z \cup (X-U)$ as the final Y and Z. If the former is larger, all vertices in X−U are added into Z, and these vertices are deleted from X. If the former is smaller, then all vertices in U are added to Y, and these vertices are deleted from X. The general step above is repeated until X is empty. Once Y is known, the algorithm computes $\gamma=(d(w)+\Sigma_{y \in Y}g(y))/|Y|$. The time involved in the above step is proportional to |X| once x is chosen from X. If x is chosen to have the median g(x) among vertices in X by using a linear-time median-finding algorithm, the total time is linear in the worst case.

A variant of the above vertex balancing algorithm is to choose x in X randomly. Then the total expected time to compute $\gamma$, Y, and Z is linear in the degree of w.

Environment for Software

Instructions of software described above (including the analysis software module 112 in FIG. 1) are loaded for execution on a processor (e.g., CPU 108). The processor includes microprocessors, microcontrollers, processor modules or subsystems (including one or more microprocessors or microcontrollers), or other control or computing devices.

Data and instructions (of the software) are stored in respective storage devices, which are implemented as one or more computer-usable or computer-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details.

While the invention has been disclosed with respect to a limited number of embodiments, those skilled in the art will appreciate numerous modifications and variations therefore. It is intended that the appended claims cover such modifications and variations as fall within the true spirit and scope of the invention.

What is claimed is:

1. A method executable in a computer, comprising:
   providing a representation of a network having vertices connected by arcs; and
   iteratively selecting, by the computer, different collections of vertices in the network in which to perform moves for balancing the corresponding collections of the network, wherein the collections are represented by corresponding graphs according to a predefined structure,
   wherein balancing each of the collections of vertices comprises computing a balanced pseudoflow for vertices arranged in a star, the star having a center vertex and adjacent vertices around the center vertex, and wherein computing the balanced pseudoflow comprises:
   identifying minimum and maximum excesses for each of the adjacent vertices, wherein the minimum and maximum excesses form a set;
   selecting an interval from among plural intervals defined by the minimum and maximum excesses;
   computing an excess for the center vertex; and
   determining whether the excess for the center vertex is in the selected interval.

2. The method of claim 1, further comprising indicating that the computed excess is a final excess for the center vertex in response to determining that the computed excess is in the selected interval.

3. The method of claim 1, further comprising:
   in response to determining that the computed excess is not in the selected interval,
   (a) discarding some of the minimum and maximum excesses from the set to form an updated set,
   (b) selecting an interval $I_m$ from the updated set,
   (c) recomputing an excess for the center vertex;
   (d) determining whether the recomputed excess for the center vertex is in the interval $I_m$;
   (e) repeating steps (a)-(d) by iterating through m until it is determined that the recomputed excess for the center vertex is in the interval $I_m$, and
   using the recomputed excess that is in the interval $I_m$ as the final excess of the center vertex.

4. The method of claim 1, wherein selecting the interval comprises selecting the interval by one of
   (1) finding a median value in the set and identifying the interval based on the median value, and
   (2) selecting a random value and identifying the interval based on the selected random value.

5. The method of claim 1, further comprising:
   determining the final excess for the center vertex; and
   computing flows over edges between the adjacent vertices and the center vertex based on the final excess for the center vertex.

6. The method of claim 5, further comprising:
   identifying plural subsets of the adjacent vertices;
   for a first of the plural subsets, seeking a final excess of each of the adjacent vertices in the first subset equal to a corresponding maximum excess, wherein each of the maximum excesses corresponding to the adjacent vertices in the first subset is less than the final excess of the center vertex;

for a second of the plural subsets, setting a final excess with each of the adjacent vertices in the second subset equal to a corresponding minimum excess, wherein each of the minimum excesses corresponding to the adjacent vertices in the second subset is greater than the final excess of the center vertex; and for a third of the plural subsets, setting a final excess of each of the adjacent vertices in the third subset equal to the final excess of the center vertex.

7. The method of claim 1, wherein balancing the collections comprises balancing vertices of a parametric bipartite network.

8. The method of claim 1, wherein providing the representation of a network comprises providing a representation of one of a computer network system, a computer, a transportation system, a hydraulic system, a communications system, a financial system, a scheduling system, a location and layout determination system, a warehouse and distribution system, a production planning and control system, and an energy reduction system.

9. A method executable in a computer, comprising:
providing a representation of a network having vertices connected by arcs;
iteratively selecting, by the computer, different collections of vertices in the network in which to perform moves for balancing the corresponding collections of the network, wherein the collections are represented by corresponding graphs according to a predefined structure;
identifying the collections of vertices as paths in the network, wherein each of the paths includes a succession of vertices, wherein each of the paths is a monotone path in which excesses associated with the vertices in the corresponding monotone path are non-increasing or non-decreasing along the corresponding monotone path, wherein at least a particular one of the monotone paths is dividable into plural groups; and
iteratively combining groups of the particular monotone path to balance the vertices of the particular monotone path.

10. The method of claim 9,
wherein combining the groups comprises combining at least two of the groups to form a combination group; and
the method further comprising:
computing a common excess for the vertices of the combination group, wherein the common excess is a weighted average of the excesses of the vertices in the at least two groups.

11. A method executable in a computer, comprising:
providing a representation of a network having vertices connected by arcs;
iteratively selecting, by the computer, different collections of vertices in the network in which to perform moves for balancing the corresponding collections of the network, wherein the collections are represented by corresponding graphs according to a predefined structure;
identifying the collections of vertices as paths in the network, wherein each of the paths includes a succession of vertices;
for each vertex of a particular one of the paths, computing a first excess and a second excess;
combining the vertices of the particular path into first groups of vertices, wherein in each first group the vertices have a common first excess; and
combining the vertices of the particular path into second groups of vertices, wherein in each second group the vertices have a common second excess;
defining a frozen part of the particular path in which vertices are balanced;
comparing one of the common first excesses with one of the common second excesses; and
moving vertices associated with the second group associated with the one common second excess into the frozen part based on the comparing.

12. A computer-usable storage medium storing instructions that when executed cause a computer to:
represent a network with a graph having vertices connected by arcs; and
iteratively select different trees of vertices in the graph in which to perform moves for balancing the corresponding trees of the network, wherein each tree has a root vertex and leaf vertices, and wherein balancing a particular one of the trees comprises:
computing a function for each of the leaf vertices in the particular tree, wherein a value of the function varies with an excess value of each corresponding leaf vertex;
computing functions for corresponding non-leaf vertices of the particular tree using a bottom-up procedure, wherein the functions for the corresponding non-leaf vertices that are parents of the leaf vertices are based on the functions for the leaf vertices; and
computing flow values in the particular tree using the functions computed for the leaf vertices and non-leaf vertices.

13. The article of claim 12, wherein computing the functions using the bottom-up procedure comprises computing the functions for non-leaf vertices using one of sorted lists and binary search trees to represent values associated with child vertices.

* * * * *